US010255760B2

(12) United States Patent
Nakamura et al.

(10) Patent No.: US 10,255,760 B2
(45) **Date of Patent: *Apr. 9, 2019**

(54) GAMING MACHINE, METHOD OF CONTROLLING GAMING MACHINE, AND COMPUTER-READABLE RECORDING MEDIUM

(71) Applicant: Konami Gaming, Inc., Las Vegas, NV (US)

(72) Inventors: Daisuke Nakamura, Zama (JP); Jason Gilmore, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/880,751

(22) Filed: Jan. 26, 2018

(65) Prior Publication Data

US 2018/0151021 A1 May 31, 2018

Related U.S. Application Data

(63) Continuation of application No. 14/477,062, filed on Sep. 4, 2014, now Pat. No. 9,916,727.

(30) Foreign Application Priority Data

Sep. 18, 2013 (JP) ................................ 2013-192845
Jul. 25, 2014 (JP) ................................ 2014-152313

(51) Int. Cl.
*A63F 9/24* (2006.01)
*A63F 13/00* (2014.01)
(Continued)

(52) U.S. Cl.
CPC ............ *G07F 17/326* (2013.01); *G07F 17/34* (2013.01)

(58) Field of Classification Search
USPC .................................. 463/16, 20, 22, 25, 30
See application file for complete search history.

(56) References Cited

U.S. PATENT DOCUMENTS 6,270,412 B1 8/2001 Crawford et al.
8,366,540 B2 2/2013 Yoshimi
(Continued)

FOREIGN PATENT DOCUMENTS

CN 1647841 A 8/2005
CN 101095987 A 1/2008
(Continued)

OTHER PUBLICATIONS

Australian Patent Examination Report No. 1 (AU Patent Application No. 2014216018); dated Oct. 26, 2015.
(Continued)

*Primary Examiner* — Adetokunbo O Torimiro
(74) *Attorney, Agent, or Firm* — Howard & Howard Attorneys PLLC

(57) ABSTRACT

A gaming machine, a method of controlling a gaming machine, and a computer-readable recording medium storing a program wherein a first game and a second game are related to each other are provided. In a gaming machine, a first area and a second area sharing virtual reel strips are displayed, only the first area is set as a determination area in a first game, and both the first area and the second area are set as determination areas in a second game. Therefore, the first game and the second game can be provided in a form such that they are related.

17 Claims, 22 Drawing Sheets

(51) Int. Cl.

| | |
|---|---|
| ***G06F 17/00*** | (2006.01) |
| ***G06F 19/00*** | (2018.01) |
| ***G07F 17/32*** | (2006.01) |
| *G07F 17/34* | (2006.01) |

(56) References Cited

U.S. PATENT DOCUMENTS

| | | | | |
|---|---|---|---|---|
| 8,485,885 | B2 | 7/2013 | Suda | |
| 9,390,588 | B2 * | 7/2016 | Elias | G07F 17/3267 |
| 2002/0025852 | A1 | 2/2002 | Alcorn et al. | |
| 2002/0173354 | A1 | 11/2002 | Winans et al. | |
| 2002/0183105 | A1 | 12/2002 | Cannon et al. | |
| 2003/0045345 | A1 * | 3/2003 | Berman | G07F 17/3211 463/20 |
| 2004/0043815 | A1 | 3/2004 | Kaminkow | |
| 2005/0170879 | A1 | 8/2005 | Tachikawa | |
| 2006/0073879 | A1 | 4/2006 | Baerlocher | |
| 2006/0287058 | A1 | 12/2006 | Resnick et al. | |
| 2008/0004100 | A1 | 1/2008 | Hein et al. | |
| 2008/0051174 | A1 | 2/2008 | Fiden | |
| 2009/0117971 | A1 | 5/2009 | Yoshizawa | |
| 2009/0124325 | A1 * | 5/2009 | Wadleigh | G07F 17/3267 463/20 |
| 2009/0203420 | A1 | 8/2009 | Yoshizawa | |
| 2010/0033172 | A1 | 2/2010 | Gleich et al. | |
| 2010/0304843 | A1 | 12/2010 | Aoki et al. | |
| 2012/0122564 | A1 | 5/2012 | Kovacs et al. | |
| 2012/0322539 | A1 | 12/2012 | Kitamura et al. | |
| 2013/0065663 | A1 | 3/2013 | Johnson et al. | |
| 2014/0094249 | A1 | 4/2014 | Gugler et al. | |
| 2014/0274282 | A1 | 9/2014 | Mastropietro et al. | |

FOREIGN PATENT DOCUMENTS

| | | | |
|---|---|---|---|
| CN | 101149856 | | 3/2008 |
| CN | 101206781 | A | 6/2008 |
| CN | 103258381 | A | 8/2013 |
| EP | 1463009 | A2 | 9/2004 |
| JP | 2004-267242 | A | 9/2004 |
| JP | 2008-048791 | A | 3/2008 |
| JP | 2008048971 | A | 3/2008 |
| JP | 2008-188222 | A2 | 8/2008 |
| JP | 2009-112777 | A | 5/2009 |
| JP | 2009-207663 | A | 9/2009 |
| JP | 2013-505741 | A | 2/2013 |

OTHER PUBLICATIONS

Office Action (MO Patent Application No. I/001335); dated Nov. 11, 2015.

Office Action (JP Patent Application No. 2014-152313); dated May 22, 2018.

Office Action (JP Patent Application No. 2014-152313); dated Jan. 9, 2019; 4 pages.

* cited by examiner

GAMING MACHINE, METHOD OF CONTROLLING GAMING MACHINE, AND COMPUTER-READABLE RECORDING MEDIUM

CROSS-REFERENCE TO RELATED APPLICATIONS

This application is a continuation of U.S. patent application Ser. No. 14/477,062 filed on Sep. 4, 2014, which is based upon and claims the benefit of priority from Japanese Patent Applications No. 2013-192845 (filed on Sep. 18, 2013) and No. 2014-152313 (filed on Jul. 25, 2014), the entire contents of which are incorporated herein by reference.

BACKGROUND OF THE INVENTION

Field of the Invention

The present invention relates to a gaming machine, a method of controlling a gaming machine, and a non-transitory computer-readable recording medium.

Related Background Art

Gaming machines such as slot machines are popular among casino customers as devices through which customers can easily enjoy gambling. Recent statistics indicate that income from gaming machines accounts for at least half of casino income in several jurisdictions. Early slot machines were simple devices that received inserted coins, and spun and stopped mechanical reels according to a handle operation, with a win or a loss determined according to a combination of symbols stopped on a single pay line. However, recent gaming machines have increased in sophistication to include mechanical slot machines in which physical reels are driven with high precision using computer-controlled stepping motors, video slot machines in which virtual reels are displayed on a display connected to a computer, and various gaming machines in which similar technology is applied to other casino games. For manufacturers developing these gaming machines, improving the functionality of gaming machines and providing highly attractive games that attract casino customers to play are important areas of focus.

In view of this background, various devices of a form having a plurality of display devices and displaying a game screen on each display device have been proposed for recent gaming machines. A known example of such a gaming machine is one that provides a primary game in the form of a slot machine using a first display device, and provides a secondary game such as a wheel lottery game, bingo game, or fishing game using a second display device when the primary game satisfies a condition. Furthermore, FIG. 9 of U.S. Pat. No. 8,366,540 (Patent Literature 1) discloses a gaming machine with two display devices provided with a symbol display area in each. The gaming machine provides a primary game in the form of a slot machine using one of the symbol display areas, and, when the primary game satisfies a triggering condition, provides a secondary game similarly in the form of a slot machine using the other symbol display area. Moreover, a gaming machine is also known that provides a free game wherein credit is not consumed as the secondary game, in accordance with the outcome of the primary game.

SUMMARY OF THE INVENTION

However, when the gaming machine provides the secondary game in the form different from the slot machine in the second display device while providing the primary game in the form of the slot machine in the first display device, there is no continuity between the primary game and the secondary game because the primary game and the secondary game are mutually different games. In addition, although the gaming machine disclosed in Patent Literature 1 is a gaming machine that provides the primary game and the secondary game in the form of the slot machine in the symbol display areas, the primary game and the secondary game have mutually independent outcomes using different reel sets, and there is no intention of relating the two games to one another. This absence of relation results in discontinuity in the transition from the primary game to the secondary game, making it difficult to provide players with a superior user experience.

On the other hand, when the gaming machine provides a free game that does not consume credit as a secondary game in accordance with the outcome of the primary game, the free game as the secondary game generally uses a game screen and rules similar to the primary game. However, although the continuous transition from the primary game to the secondary game is performed in this case, there is a problem in that it is difficult to clearly identify any particular added value or advantage of the secondary game aside from no credit being consumed.

The present invention has been made in view of the above-described circumstances, and one object is to provide a gaming machine, a method of controlling a gaming machine, and a computer-readable recording medium storing a program in which a primary game and a secondary game are related to each other. Another object is to provide a gaming machine, a method of controlling a gaming machine, and a computer-readable recording medium storing a program in which an added value or advantage of the secondary game relative to the primary game can be demonstrated in a straightforward manner.

In order to solve the above-described problem, a gaming machine according to one aspect of the present invention is a gaming machine for providing a game to a player, the gaming machine including: a display unit having a symbol display area including a first area and a second area, the display unit displaying a plurality of columns side by side with symbols displayed in each, the first area and the second area being provided in line with a direction of the columns; an operation unit configured to receive an operation by the player; and a controller connected to the display unit and the operation unit, wherein the controller rearranges symbols displayed in the symbol display area when the operation by the player is received in the operation unit, and provides a first game and a second game provided when a predetermined condition is satisfied, wherein a win determination is conducted in the first game for symbols displayed in the first area from among the rearranged symbols, and a win determination is conducted in the second game for symbols displayed in the first area and the second area from among the rearranged symbols.

In addition, a gaming machine according to another aspect of the present invention is a gaming machine for providing a game to a player, the gaming machine including: a display unit having a symbol display area including a first area, a second area, and a third area, the display unit displaying a plurality of columns side by side with symbols displayed in each, the first area, the second area, and the third area being provided in line with a direction of the columns; an operation unit configured to receive an operation by the player; and a controller connected to the display unit and the operation unit, wherein the controller rearranges symbols displayed in the symbol display area when the operation by the player is received in the operation unit, and provides a first game, a first stage of a second game provided when a first condition is satisfied and a second stage of the second game provided when a second condition is satisfied, wherein a win determination is conducted in the first game for symbols displayed in the first area from among the rearranged symbols, a win determination is conducted in the first stage of the second game for symbols displayed in the first area and the second area from among the rearranged symbols, and a win determination is conducted in the second stage of the second game for symbols displayed in the first area, the second area, and the third area from among the rearranged symbols.

In addition, a method of controlling a gaming machine according to one aspect of the present invention is for providing a game to a player using a display unit having a symbol display area including a first area and a second area, the display unit displaying a plurality of columns side by side with symbols displayed in each, the first area and the second area being provided in line with a direction of the columns, the method including: rearranging, via a controller, symbols displayed in the symbol display area of the display unit when an operation by the player is received in an operation unit, and providing a first game and a second game provided when a predetermined condition is satisfied, wherein a win determination is conducted in the first game for symbols displayed in the first area from among the rearranged symbols, and a win determination is conducted in the second game for symbols displayed in the first area and the second area from among the rearranged symbols.

In addition, a non-transitory computer-readable recording medium storing a program of a gaming machine according to one aspect of the present invention is for causing one or more computers to implement a function of providing a game to a player using a display unit having a symbol display area including a first area and a second area, the display unit displaying a plurality of columns side by side with symbols displayed in each, the first area and the second area being provided in line with a direction of the columns, the program causing the one or more computers to function as: a controller configured to rearrange symbols displayed in the symbol display area of the display unit when an operation by the player is received in an operation unit, and provide a first game and a second game provided when a predetermined condition is satisfied, wherein a win determination is conducted in the first game for symbols displayed in the first area from among the rearranged symbols, and a win determination is conducted in the second game for symbols displayed in the first area and the second area from among the rearranged symbols.

According to one aspect of the present invention, a gaming machine, a method of controlling a gaming machine, and a computer-readable recording medium storing a program wherein a first game and a second game are mutually related are provided.

DESCRIPTION OF THE PREFERRED EMBODIMENTS

Figure 1:
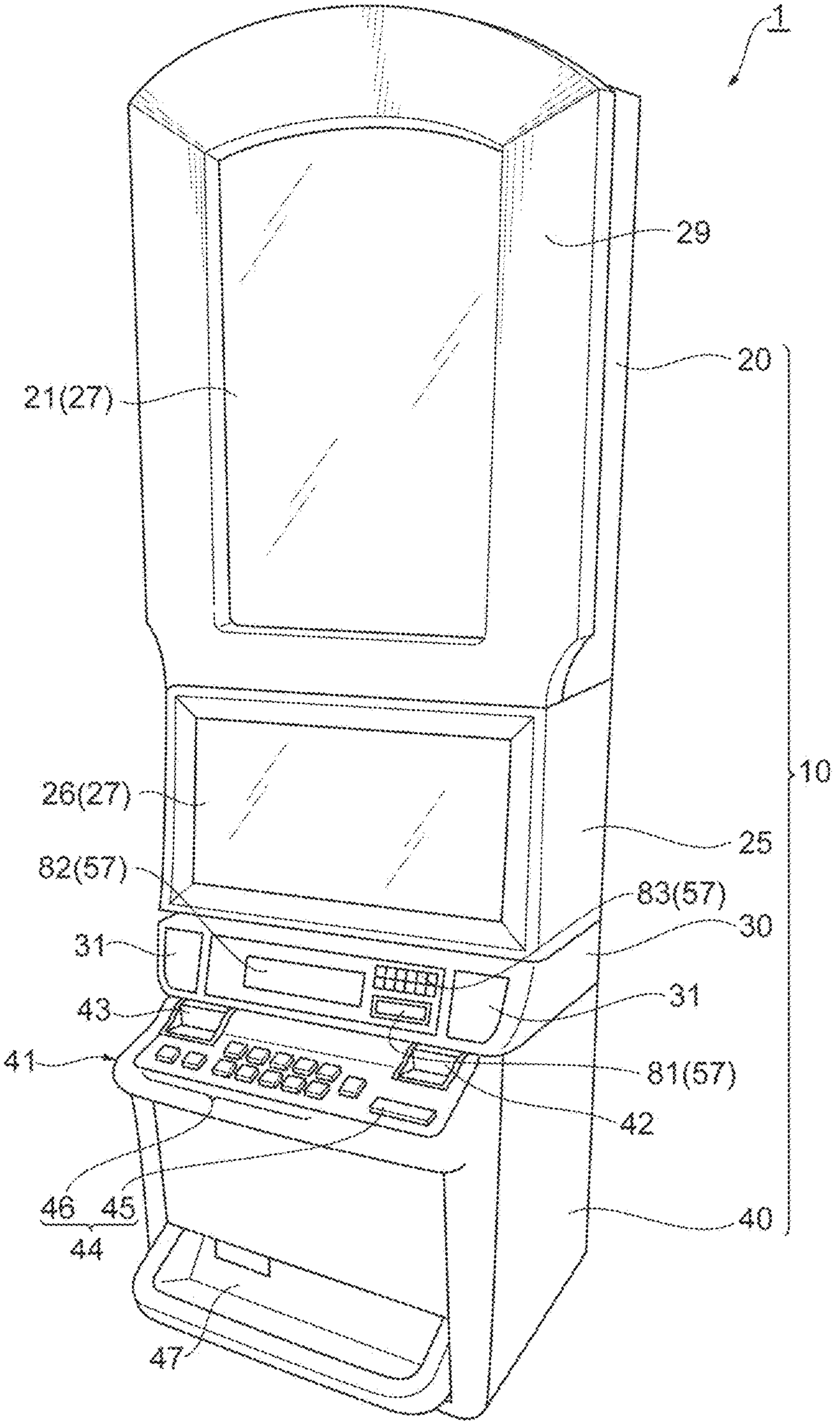
FIG. 1 is a perspective view of a gaming machine according to a first embodiment.

Hereinafter, a gaming machine according to a first embodiment of the present invention will be described with reference to the accompanying drawings. It should be noted that identical reference signs are assigned to identical or equivalent elements in the drawings, and redundant descriptions thereof will be omitted.

Figure 2:
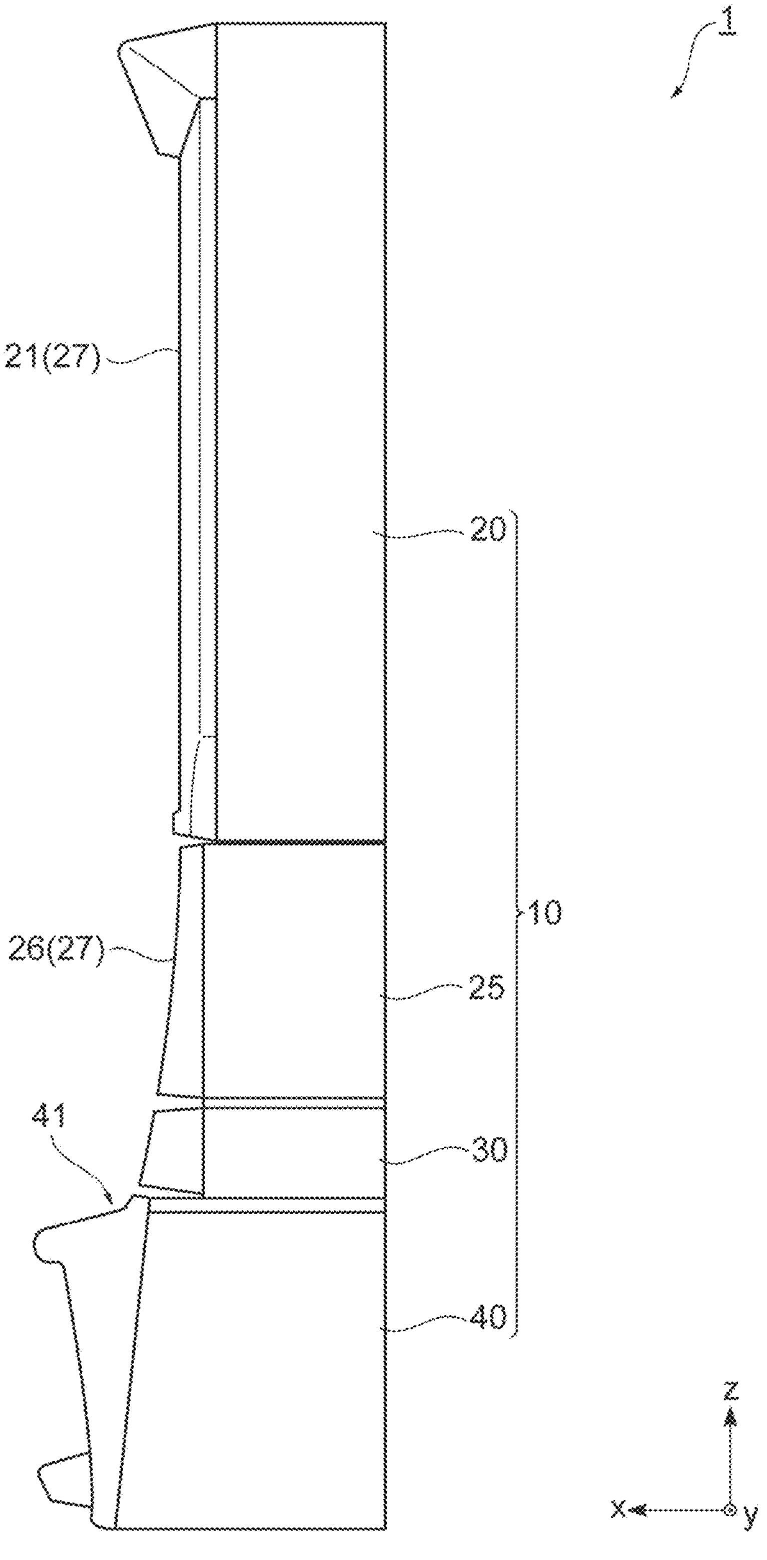
FIG. 2 is a side view of the gaming machine of FIG. 1.

The gaming machine according to this embodiment receives a predetermined game value from a player, generates a game outcome, and provides the player with a dividend according to the outcome of the game. FIG. 1 is a perspective view of the gaming machine 1 according to the first embodiment of the present invention, and FIG. 2 is a side view of the gaming machine 1. As illustrated in FIGS.

1 and 2, the gaming machine 1 has a housing 10 including a first cabinet 20 with an upper display 21, a second cabinet 25 with a lower display 26, a third cabinet 30 housing a player tracking unit 57 and a fourth cabinet 40 having a control panel 41 and housing a controller 50 for controlling each part. Hereinafter, each configuration will be described.

The upper part of the housing 10 is provided with the first cabinet 20, and the second cabinet 25 is provided below the first cabinet 20. The upper display 21 provided to the first cabinet 20 and the lower display 26 provided to the second cabinet 25 are both flat panel display devices such as liquid display devices or organic electroluminescence (EL) display devices, and function as a display unit 27 providing a player with game screens to be described through control from the controller 50. In addition, the first cabinet 20 is provided with an illumination 29 for providing decorative lighting around the upper display 21. The upper display 21 and the lower display 26 are provided vertically adjacent, and the player can shift his/her field of vision between the screen of the upper display 21 and the screen of the lower display 26 without significant up-down movement in his/her line of sight, making it easy to view both screens simultaneously.

The third cabinet 30 is provided under the second cabinet 25. Speakers 31 are provided on the left and right of a front face of the third cabinet 30, and are controlled by the controller 50 to provide sound to the player. In addition, the player tracking unit 57 is housed in the center of the front face of the third cabinet 30. The player tracking unit 57 has a card reader 81 for recognizing a player identification card, a display 82 for presenting information to the player, and a keypad 83 for receiving an input by the player. This player tracking unit 57 operates in cooperation with the controller 50 or an external system to be described to read information recorded on the player identification card inserted into the card reader 81 by the player, and displays the information read from the card or information acquired by communicating with the external system on the display 82. In addition, the input from the player is received by the keypad 83, a display of the display 82 is changed according to the input, and communication with the external system is conducted as necessary.

The fourth cabinet 40 is disposed below the third cabinet 30. Fourth cabinet 40 is provided with the control panel 41 extending partially forward. Control panel 41 is provided with a bill/ticket identification unit 42, a printer unit 43, and an operation unit 44. The bill/ticket identification unit 42 is disposed in the control panel 41 such that an insertion opening for inserting a bill or ticket is exposed, an identification unit for identifying the bill/ticket using various types of sensors is provided behind the insertion opening, and an exit side of the identification unit inside the fourth cabinet 40 is provided with a bill/ticket storage unit. The printer unit 43 is disposed in the control panel 41 such that a ticket output opening from which a ticket is output is exposed, a printing unit for printing predetermined information on printing paper is provided behind the ticket output opening, and a paper entry side of the printing unit is provided with a housing unit housing the printing paper.

The bill/ticket identification unit 42 receives and identifies a bill and a ticket (including a voucher and a coupon) that is a game value in exchange for executing the game, and notifies the controller 50 to be described. The printer unit 43 prints information corresponding to credit payout processing from the gaming machine 1 onto the paper and outputs a ticket, under control of the controller 50 to be described. The output ticket is inserted into a bill/ticket identification unit of another gaming machine, enabling the paid credit to be used for playing a game or for conversion into cash at a kiosk terminal or casino cage.

The operation unit 44 is a button group for receiving various types of instructions to the gaming machine 1 from the player. The operation unit 44 includes, for example, a spin button 45 and a setting button group 46. The spin button 45 receives an instruction to start a game (start of reel spin), which will be described later. The setting button group 46 includes a bet button group, a line designation button group, a maximum bet button, and a payout button, etc. The bet button group receives an instruction operation regarding an amount of credit (the number of bets) bet by the player. The line designation button group receives an instruction operation from the player designating a line (hereinafter referred to as a validity line) serving as a line judgment target to be described. The maximum bet button receives an instruction operation from the player regarding a bet of a maximum amount of credit that can be bet at one time. The payout button receives an instruction operation from the player to issue a payout instruction for the credit accumulated in the gaming machine 1.

In addition, a control board equipped with a central processing unit (hereinafter abbreviated as CPU) 51, a memory 53, an interface unit 52, and a storage 54, etc., is embedded inside the fourth cabinet 40. These elements on the control board configure the controller 50. The control board is configured to be capable of communicating with each of the above-described components mounted in the first cabinet 20, the second cabinet 25, the third cabinet 30, and the fourth cabinet 40, via the interface unit 52, and controls an operation of each component by executing a program recorded on the memory 53 or the storage 54 in the CPU 51, to provide the game to the player.

Figure 3:
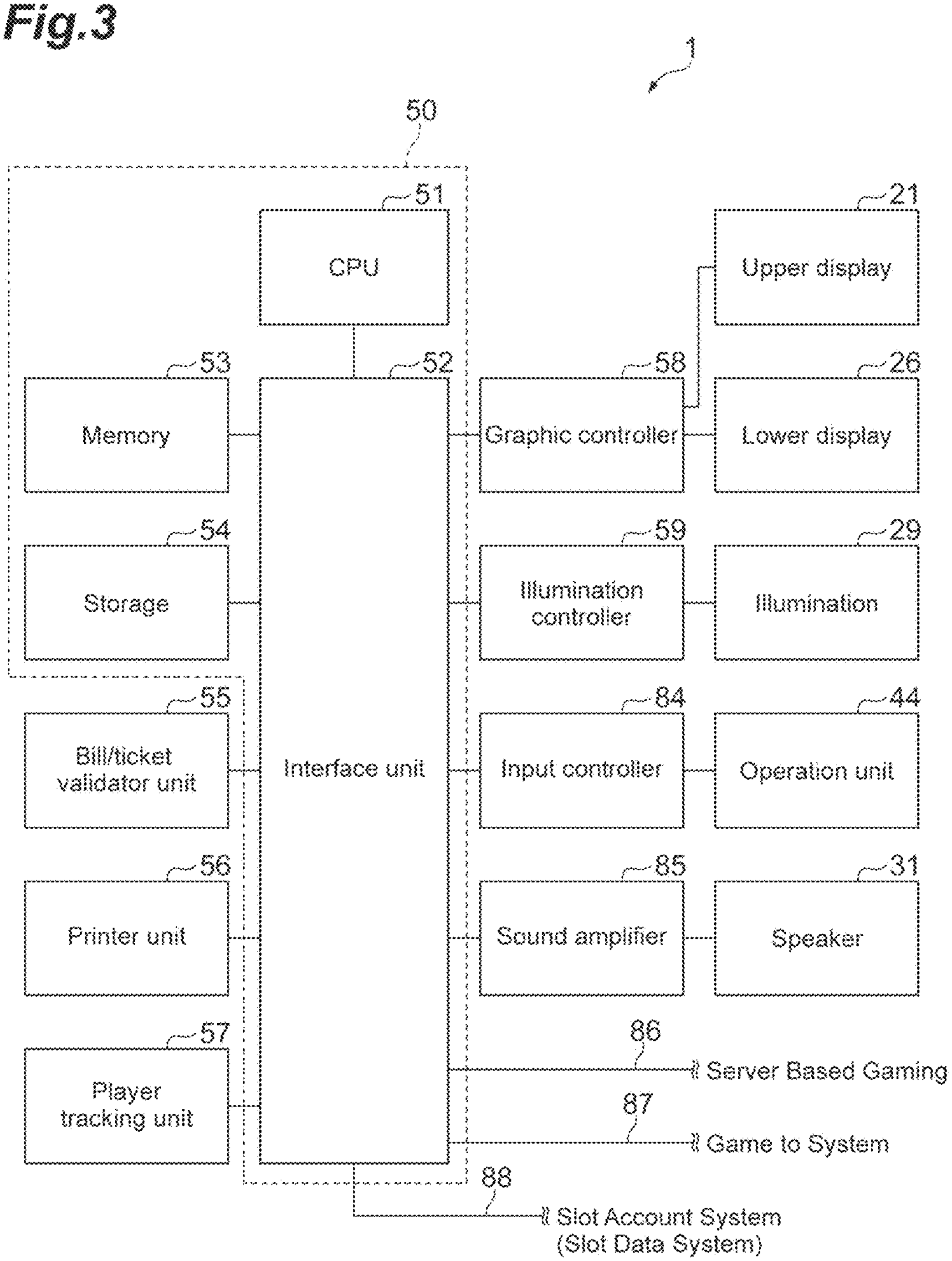
FIG. 3 is a block diagram of the gaming machine of FIG. 1

FIG. 3 illustrates a functional block diagram of the gaming machine 1 according to this embodiment. The gaming machine 1 includes the controller 50. The controller 50 is configured as a computer unit including a CPU 51, an interface unit 52 connected to the CPU 51 and having a chip set for providing communication functions of a memory bus, various types of expansion buses, a serial, a Universal Serial Bus (USB), and Ethernet (registered trademarks), etc., and a memory 53 and a storage 54 to which the CPU 51 can refer via the interface unit 52. The memory 53 can be configured to include a random access memory (RAM), which is volatile storage medium, a read only memory (ROM), which is a nonvolatile storage medium, or an electrically erasable programmable ROM (EEPROM), which is a rewritable nonvolatile storage medium. The storage 54 functions as an external storage device for the controller 50. A memory card and a magneto-optic disc, which are removable storage mediums, or a hard disk may be used as the storage 54.

The bill/ticket validator unit 55, the printer unit 56, the player tracking unit 57, a graphic controller 58, an illumination controller 59, an input controller 84, and a sound amplifier 85 are connected to the interface unit 52 in addition to the CPU 51, the memory 53, and the storage 54.

The controller 50 having the memory 53 and the storage 54 as described above controls each unit by executing a program stored in the memory 53 and the storage 54, and provides the game to the player. A configuration may be adopted here, for example, wherein programs and data of an operating system and a subsystem for providing a basic function of the controller 50 are stored in the EEPROM of the memory 53, and a program and data of an application for providing the game are stored in the storage 54. Adopting such a configuration makes it possible to easily switch or update the game by exchanging the storage 54. It should be noted that the controller 50 may also be configured as a multiprocessor having a plurality of CPUs.

Each block connected to the controller 50 will be described hereafter.

The bill/ticket validator unit 55 is a component that receives a bill or a ticket through the insertion opening and identifies a type of the bill or information corresponding to credit payout processing of the ticket. When the bill/ticket validator unit 55 notifies the controller 50 of the above-described information, the controller 50 increases an amount of credit available in the game according to content of the notification. The printer unit 56 prints a ticket indicating information corresponding to credit payout processing from the gaming machine 1 and outputs the ticket under control of the controller 50 receiving the operation of the payout button in the above-described setting button group 46. The player tracking unit 57 operates in cooperation with the controller 50 to transmit and receive information about the player, etc., to and from a casino management system.

The graphic controller 58 controls the upper display 21 and the lower display 26 to display screen images including various types of graphic data under control of the controller 50. The illumination controller 59 controls the illumination 29 to provide a decorative lighting effect, under control of the controller 50. The sound amplifier 85 drives the speakers 31 to provide various types of sounds such as announcements, sound effects, and background music (BGM), etc., under control of the controller 50.

In addition, the interface unit 52 includes various types of communication interfaces for communicating outside the gaming machine 1 and, for example, can communicate with an external network using Ethernet connections 86 and 87 and a serial output 88. In this embodiment, one example is shown wherein communication is conducted with a known server-side gaming network (Server Based Gaming of FIG. 3), a G2S network (Game to System of FIG. 3), and a slot information system (Slot Data System of FIG. 3), respectively.

Figure 4:
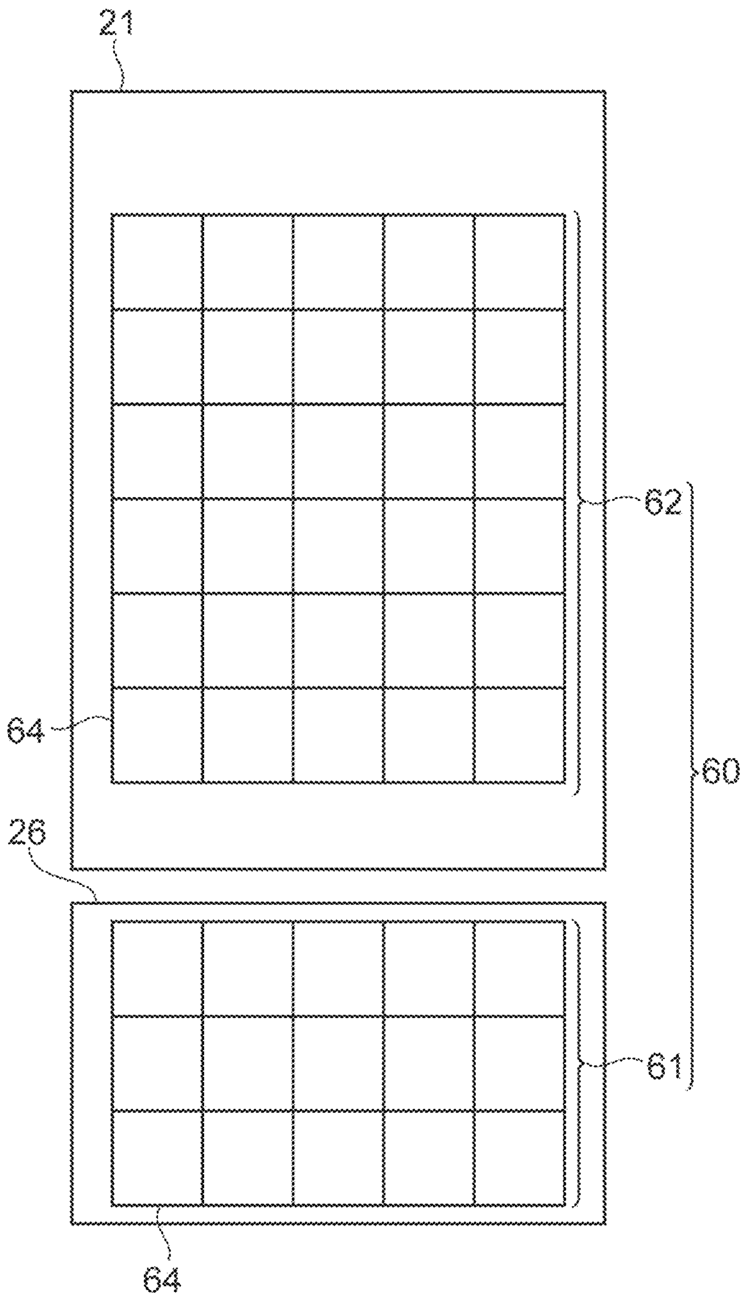
FIG. 4 is a schematic diagram illustrating an example of first and second areas of a symbol display area of the gaming machine of FIG. 1.

FIG. 4 is a diagram schematically illustrating a game screen provided by the gaming machine 1 according to this embodiment. This game screen is displayed on the upper display 21 and the lower display 26 by the controller 50 executing a predetermined program. As illustrated in FIG. 4, this game screen includes a symbol display area 60 for displaying symbols. In addition, the symbol display area 60 includes a first area 61 displayed on the lower display 26 and a second area 62 displayed on the upper display 21. Using such game screens, the gaming machine 1 of this embodiment operates as a slot machine displaying a game outcome by rearranging symbols displayed in the symbol display area 60 in exchange for a predetermined game value, and a dividend is paid according to a combination of the symbols included in the game outcome.

Also, although omitted in FIG. 4, it is possible to provide the upper display 21 and the lower display 26 with an area displaying the number of credits, the number of bets, and the number of credits (the number of WINs) obtained by winning, etc., as well as a decoration area, in addition to the symbol display area 60.

The first area 61 and the second area 62 include a plurality of cells 64 that are stop positions of the symbols. Specifically, the first area 61 includes 15 cells arranged in a grid shape of three rows and five columns, and the second area 62 includes 30 cells arranged in a grid shape of six rows and five columns. It should be noted that, hereinafter, a lateral direction of the upper display 21 and the lower display 26 is referred to as a row direction, and a longitudinal direction thereof is referred to as a column direction.

Figure 5:
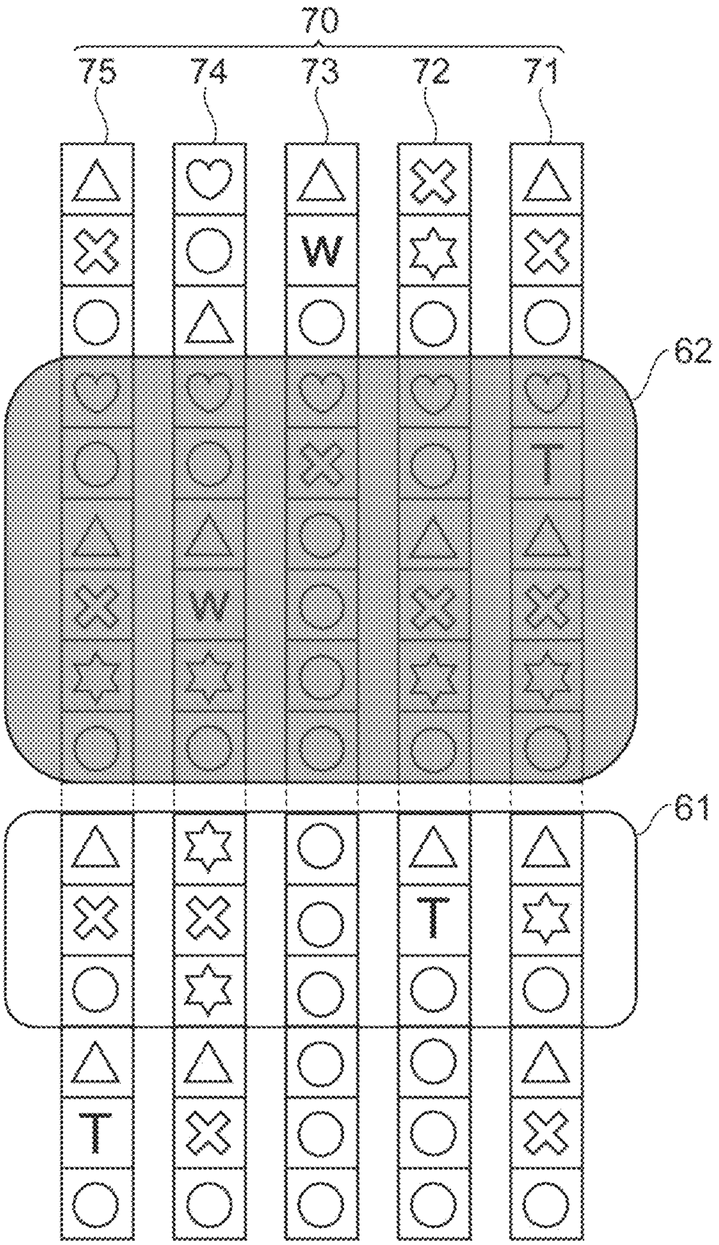
FIG. 5 is a diagram illustrating a state of each area of the symbol display area of FIG. 4 and an example of symbol arrangement.

The symbols are displayed in the cells 64 of the symbol display area 60 based on symbol arrangement of virtual reel strips 71 to 75 constituting a virtual reel set 70 as illustrated in FIG. 5. The virtual reel strips 71 to 75 here are a data structure shown by the controller 50 using a program in memory 53 or the storage 54, and show a state wherein a plurality of symbols are arranged in columns, as illustrated in FIG. 5. In addition, the virtual reel set 70 is a generic term for such virtual reel strips 71 to 75. In the example of FIG. 5, each of the virtual reel strips 71 to 75 includes 15 symbols, and these symbols are arranged in an order defined for each reel. In this embodiment, three symbols are displayed in the first area 61 and six symbols adjacent thereabove are displayed in the second area 62, in each of the virtual reel strips 71 to 75. Accordingly, a symbol column displayed in the first area 61 and a symbol column displayed in the second area 62 have mutual continuity.

In other words, when the virtual reel strips 71 to 75 are displayed such that they are spun to move the symbols from top to bottom, for example, each symbol appears on an upper end of the second area 62, moves downward, and leaves the screen from a lower end of the second area 62. The symbol that left the screen next appears on an upper end of the first area 61, moves downward, and leaves the screen from a lower end of the first area 61. In other words, each symbol moves continuously in the second area 62 and the first area 61. The same is true when the virtual reel strips 71 to 75 are displayed as spinning to move the symbols from bottom to top.

In other words, the first area 61 and the second area 62 share the same virtual reel strips 71 to 75, and display the symbol arrangement in a continuous form. It should be noted that the symbols displayed in the first area 61 and the symbols displayed in the second area 62 need not necessarily be adjacent, and symbols that are not displayed may be interposed between these areas.

The controller 50 starting the game randomly determines a stop position for each of the virtual reel strips 71 to 75, and depicts a spinning of the virtual reel strips 71 to 75 starting from a current position and stopping in the stop position using the upper display 21 and the lower display 26. Accordingly, the symbols arranged in the virtual reel strips 71 to 75 move continuously (scroll) in a longitudinal direction in the first area 61 and the second area 62, and stop such that one symbol is displayed in one cell 64 while maintaining continuity.

Figure 6:
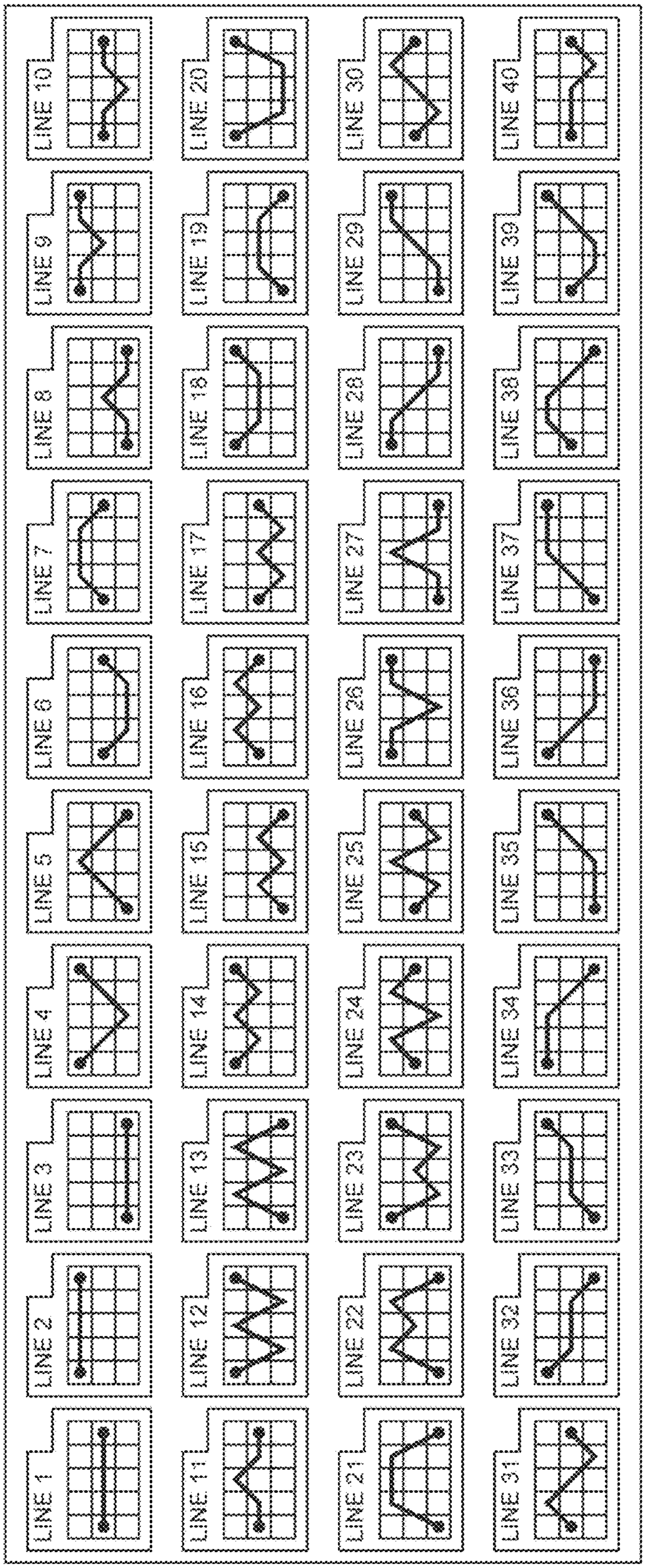
FIG. 6 is a diagram illustrating an example of pay lines set in the first area.

A pay line to be used when determining a win for symbol arrangement that are an outcome of a game is set in the symbol display area 60. The pay line is a line set to span from the cell of a leftmost column to the cell of a rightmost column, and is obtained by combining a plurality of cells 64 serving as win determination targets. The number of valid lines from among the set pay lines is selected by the player through an operation of the line designation button group included in the setting button group 46 of the operation unit 44. For the symbol arrangement that represent a game outcome, the controller 50 determines a win when identical symbols exceeding a predetermined number of identical symbols are align on the set pay line and pays the player a dividend according to the types and number of symbols, for example. In the gaming machine 1 of this embodiment, a predetermined number of pay lines (LINE 1 to LINE 40) are set for cells of three rows and five columns of the first area 61 (see FIG. 6), and pay lines (LINE 1 to LINE 80) similar to those set in the first area 61 are set in three rows and five columns on the upper side and six rows and five columns on the lower side for the cells of five rows and six columns of the second area 62 (see FIGS. 7 and 8). Naturally, the present invention is not limited to this example. An independent pay line may be set in the second area 62, or a pay line can also be set to span over both the first area 61 and the second area 62.

It should be noted that boundary lines of the cells 64 may be displayed on the upper display 21 and the lower display 26 such that the player can visually recognize the boundary lines, or the display may be omitted. In other words, it is sufficient to logically or conceptually define the cells 64 inside the gaming machine 1 as the symbol stop positions, and the boundaries of the symbols need not necessarily be visible.

The gaming machine 1 of this embodiment provides two types of games: a first game (also referred to as a main game or a primary game), and a second game (also referred to as a secondary game, a bonus game or a feature game, including a free game provided without consuming the game value) provided when the predetermined condition is satisfied in the first game. In the first game, only symbols displayed in the first area 61 in the symbol arrangement that represent a game outcome serve as win determination targets. In contrast, in the second game, all symbols displayed in both the first area 61 and the second area 62 (i.e., symbols displayed in the symbol display area 60) serve as a win determination target.

In the above-described form, the second area 62 in the symbol display area 60 may be displayed in a different form from the first area 61 during the first game, to clearly show the player that a win determination is conducted for only the first area 61 of three rows and five columns. In this case, the second area 62 may be displayed in the same form as the first area 61 to clearly show the player that the entire symbol display area 60 serves as a win determination target during the second game. As an implementation example of this presentation, FIG. 5 illustrates a case wherein a dark layer is superimposed on the second area 62 to display it darkly during the first game. When the second game is provided in the implementation example illustrated in FIG. 5, the second area 62 can be made as bright as the first area 61 by removing the dark layer superimposed on the second area 62 during the first game. A similar presentation would be a form wherein blurry symbols are displayed, a form wherein thinly colored symbols are displayed, or a form wherein the symbols are displayed in monochrome, etc., or a combination thereof. It is not essential, however, to adopt such a presentation. In addition, the symbol display area 60 may be either the first area 61 or the second area 62, and symbols displayed therein are displayed such that the player can identify them.

In addition, the entire symbol display area 60 may be used for a screen presentation even during the first game, in the above-described form. Furthermore, part of the second area 62 may be set as a win determination target in certain cases, even during the first game.

Figure 9:
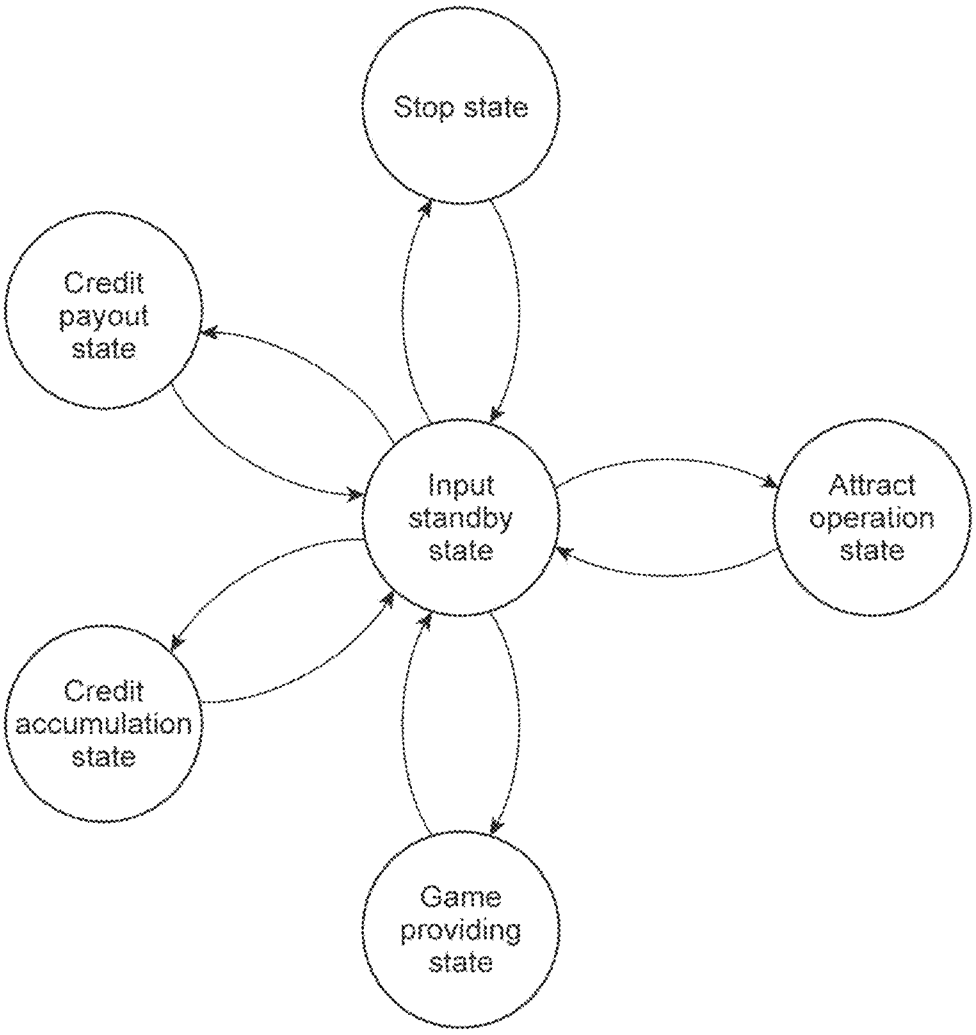
FIG. 9 is a state transition diagram of the gaming machine of FIG. 1.

Next, an operation of the gaming machine 1 according to this embodiment will be described with reference to FIG. 9. FIG. 9 illustrates a state transition diagram of the gaming machine 1 according to the embodiment configured as above. As illustrated in FIG. 9, the gaming machine 1 has a stop state, an input standby state, a credit payout state, a credit accumulation state, an attract operation state, and a game providing state. Each state will be described hereafter.

The stop state is a state wherein the gaming machine 1 is not activated. When a predetermined activation operation is received, the gaming machine 1 in the stop state is activated and initialized, a predetermined program is executed by the controller 50, game screens are displayed in the upper display 21 and the lower display 26, and the input standby state begins.

When the bill/ticket validator unit 55 identifies a bill or ticket, the gaming machine 1 of the input standby state transitions to the credit accumulation state wherein corresponding credit information is accumulated in the gaming machine 1, and returns to the input standby state when the accumulation of the credit ends. In addition, when the gaming machine 1 in the input standby state receives an operation of the payout button in a state wherein the credit information is accumulated, it transitions to the credit payout state wherein payout processing for the accumulated credit is conducted, outputs a printed ticket indicating information corresponding to the credit payout processing from the printer unit 56, and returns the credit accumulated in the gaming machine 1 to zero. The gaming machine 1 returns to the input standby state after completing these processes.

When no operation is conducted for a predetermined time, the gaming machine 1 in the input standby state transitions to the attract operation state wherein an attract screen is displayed on the upper display 21 and the lower display 26. When the gaming machine 1 in the attract state receives an operation, the gaming machine 1 returns to the input standby state. It should be noted that the attract screen is a screen for attracting customers in the casino to the gaming machine 1, and includes a predetermined image and/or moving image.

The gaming machine 1 in the input standby state sets the number of lines and the number of bets of the game by receiving an operation of the line selection button, the bet number selection button, or the maximum bet button in a state wherein credits are internally accumulated, reduces the number of credits by a product of the number of lines and the number of credits set by receiving an operation of the start button, and transitions to the game providing state. In the game providing state, a game is provided according to the flowchart illustrated in FIG. 10.

Figure 10:
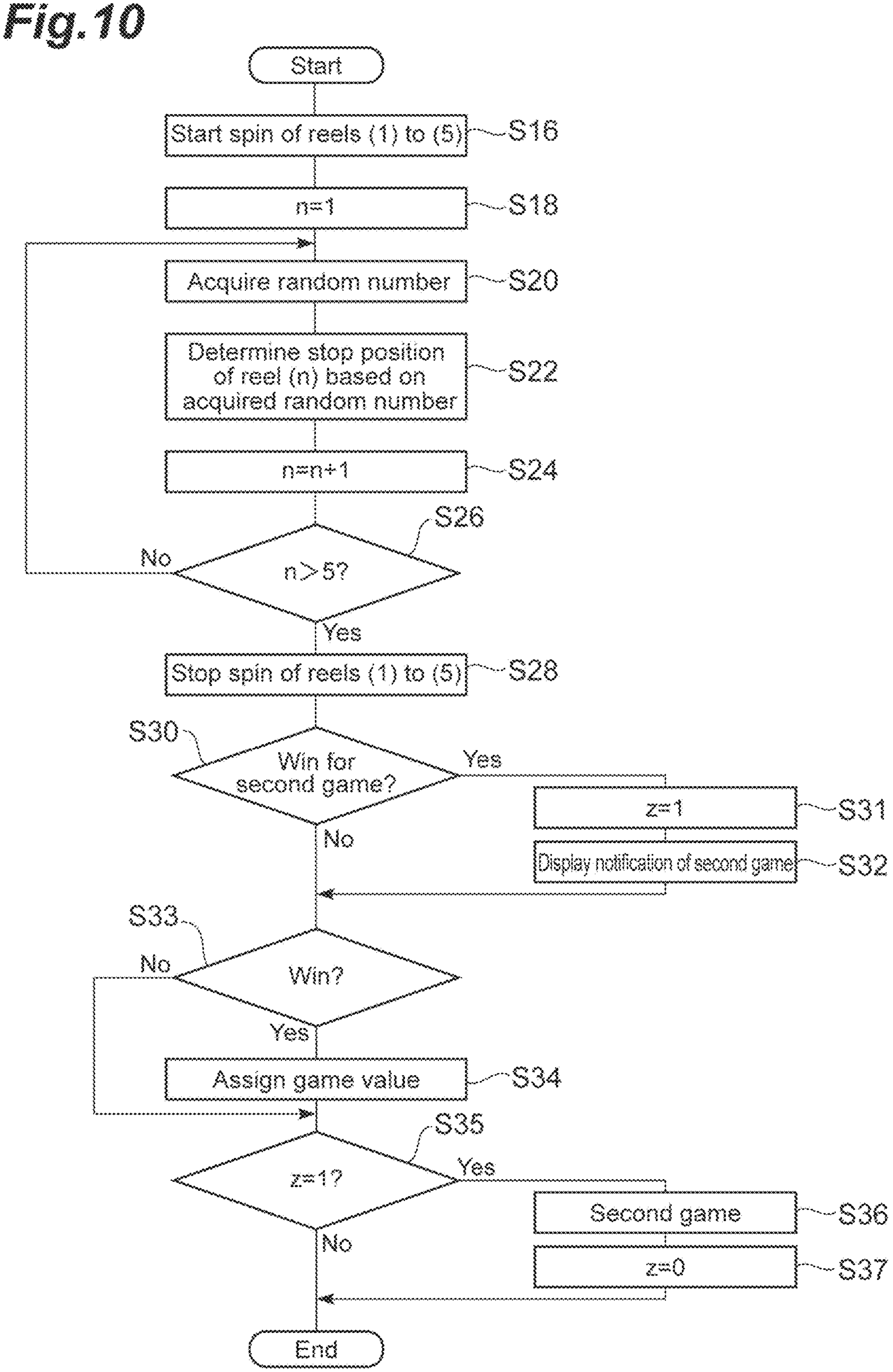
FIG. 10 is a flowchart illustrating an operation of the gaming machine of FIG. 1.

An operation in the game providing state will be described hereafter, as a method of controlling the gaming machine 1, with reference to the flowchart illustrated in FIG. 10.

The gaming machine 1 wherein the number of lines and the number of bets were set in the input standby state transitions to the game providing state after receiving an operation of the start button, and starts the first game by controlling the upper display 21 and the lower display 26 using the controller 50. During the first game, the first area 61 is displayed with normal brightness whereas the second area 62 is displayed in a dark state (see FIG. 11), and only the first area 61 is clearly shown as a determination area. First, reel (1) to reel (5) displayed in the symbol display area 60 start spinning in S16. More specifically, the columns of symbols displayed in the symbol display area 60 are scrolled in the order defined in the corresponding virtual reel strips 71 to 75, and a state wherein the reels spin is virtually displayed. Subsequently, the controller 50 sets a parameter n=1 as an initial process, in the process of S18.

Next, in the process of S20, the controller 50 acquires a random number. A method wherein the controller 50 acquires the random number is not limited to a specific method, and need only follow regulations of a jurisdiction wherein the gaming machine 1 is installed. After the random number is acquired, the process proceeds to S22. In the process of S22, the controller 50 determines the stop position of reel (n), based on the random number acquired in the process of S20. The stop position of reel (n) here corresponds to the stop positions of the corresponding virtual reel strips 71 to 75. Therefore, the stop position, for example, can be defined by associating a numerical value or a numerical value range with each of the symbols of the virtual reel strips 71 to 75, and can be determined as a position of a symbol with which a numerical value or a numerical value range including the acquired random number has been associated. In this case, a gradient or a deviation may be set for a probability of the stop position by non-uniformly defining the numerical value or the numerical value range associated with each symbol. After the stop position of reel (n) is determined, the process proceeds to S24. In the process of S24, the controller 50 sets n=n+1. After the setting, the process proceeds to S26. In the process of S26, the controller 50 determines whether or not n>5 is satisfied. When n>5 is not satisfied, the process proceeds to S20. Accordingly, the processes of S20 to S26 are iterated until n>5 is satisfied. Accordingly, the stop positions of reel (1) to reel (5) are determined. When n>5 is satisfied in S26, the process proceeds to S28, as this means that the stop positions of all of reel (1) to reel (5) have been determined.

In the process of S28, the controller 50 stops reel (1) to reel (5), based on each stop position of the virtual reel strips 71 to 75 determined in the process of S22. More specifically, the scrolling columns of the symbols displayed in the symbol display area 60 stop in each stop position determined for the virtual reel strips 71 to 75.

Figure 11:
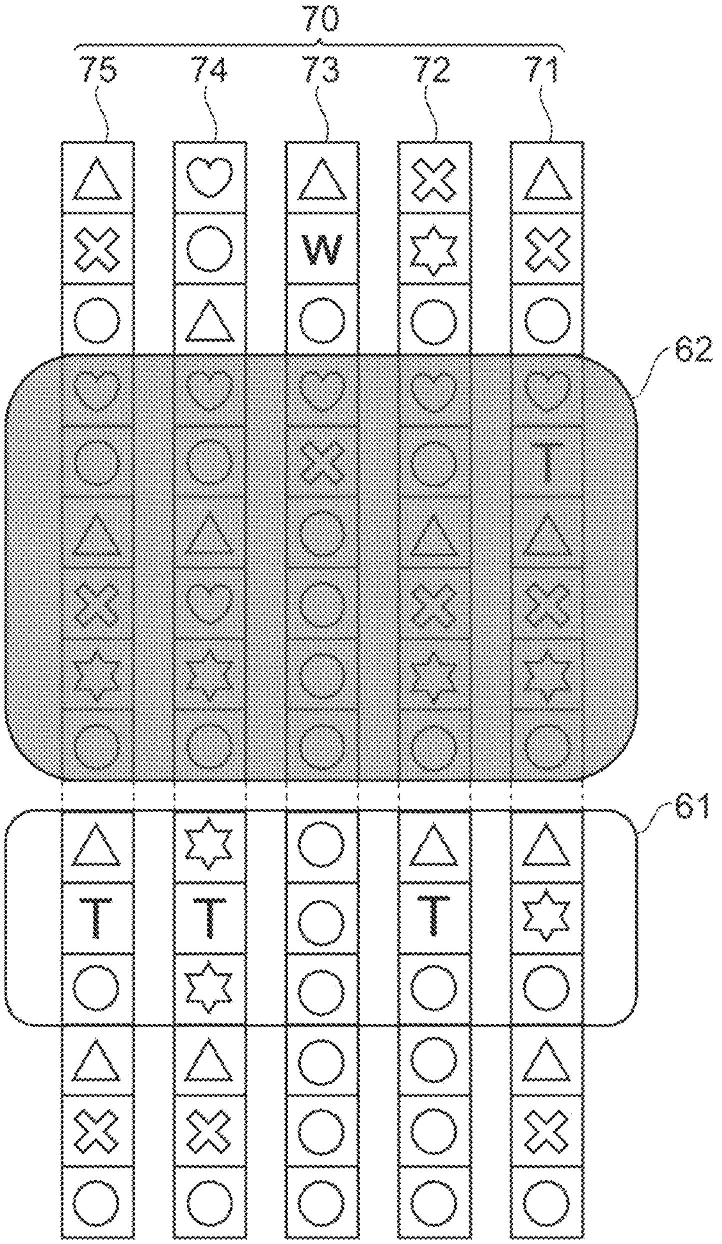
FIG. 11 is a diagram illustrating a state of each area of the symbol display area of FIG. 4 in the first game and an example of symbol arrangement.

In the process of S30, the controller 50 determines whether or not the symbols displayed in the first area 61 of the symbol display area 60 satisfy a predetermined condition for providing a second game. For example, a winning condition for the second game may include appearance of a predetermined combination of symbols on the pay line (line judgment) and/or appearance of at least a predetermined number of specific symbols (scatter symbols) in the first area 61 serving as the determination area (scatter judgment). FIG. 11 illustrates a screen for when the predetermined condition is satisfied through the scatter judgment wherein the predetermined condition is satisfied when three or more scatter symbols “T” are displayed in this embodiment.

When it is determined that the predetermined condition for providing the second game is satisfied in S30, a second game provision flag Z is set to Z=1 in S31. After the flag is set in S31, a notice indicating that the second game will be provided is displayed on the upper display 21 or the lower display 26 in S32.

The controller 50 determines in S33 whether or not the symbols displayed in the first area 61 of the symbol display area 60 include winning symbols, after S32 when it is determined that the predetermined condition for providing the second game is satisfied in S30, and after S30 when it is determined that the predetermined condition is not satisfied. For example, the line judgment and/or the scatter judgment described above is applied under a different condition from the predetermined condition for provision of a second game, and it is determined whether or not the symbols are winning symbols. When it is determined that the symbols are winning symbols, a predetermined game value (credit) corresponding to a win classification is added to the credit accumulated in the gaming machine 1 in the process of S34.

After S34 when it is determined that the symbols are winning symbols in S33 and after S33 when it is determined that the symbols are not winning symbols in S33, it is subsequently determined whether the flag Z is set to Z=1 in the process of S35. When it is determined that the flag Z is set to Z=1, the process proceeds to S36, and the controller 50 provides the second game. In this embodiment, a predetermined number of free games that do not consume the game value is provided as the second game. In the free game that is the second game, the game wherein the second area 62 of the symbol display area 60 serves as the determination area in addition to the first area 61 is provided.

Figure 7:
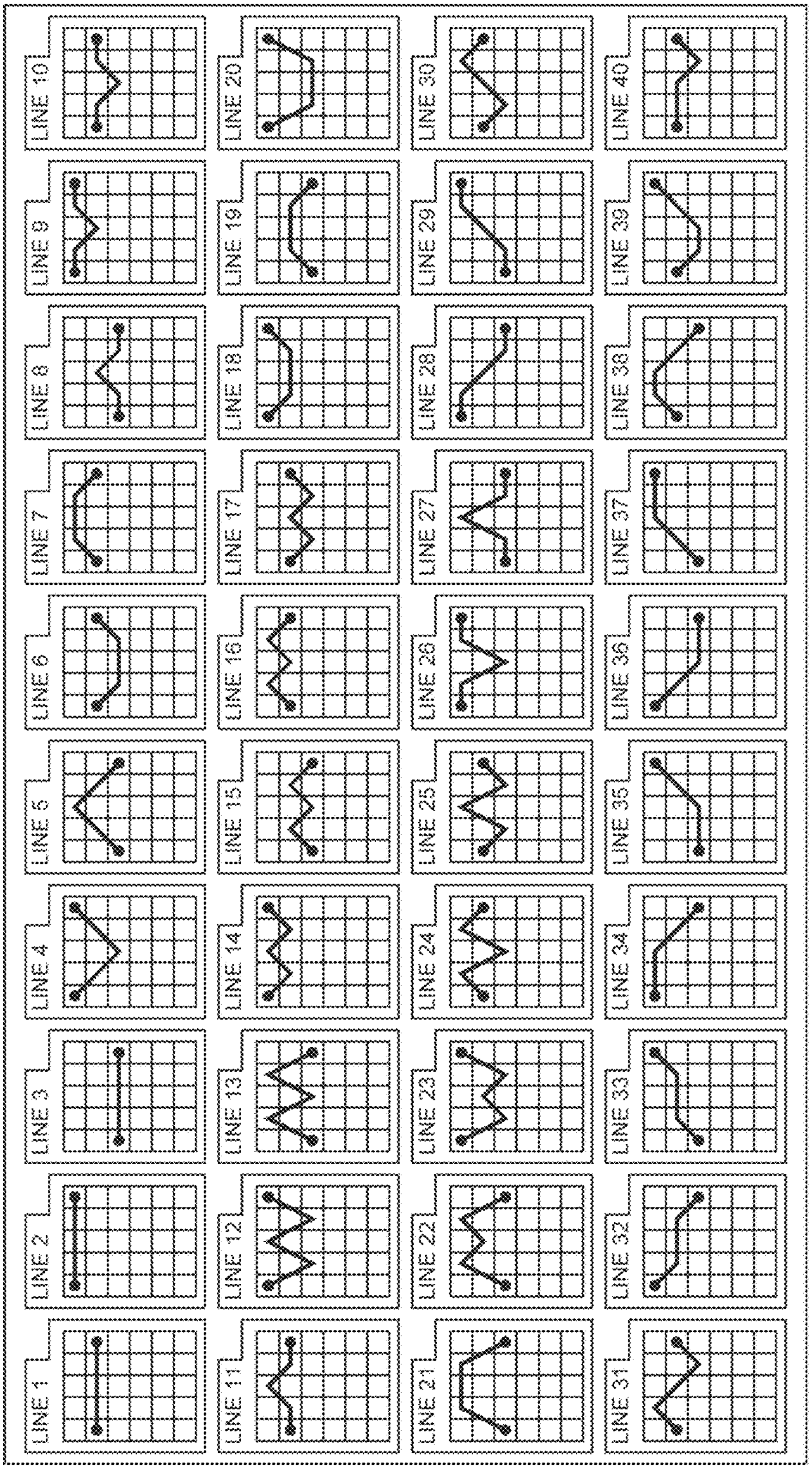
FIG. 7 is a diagram illustrating an example of pay lines set at an upper side of the second area.
Figure 8:
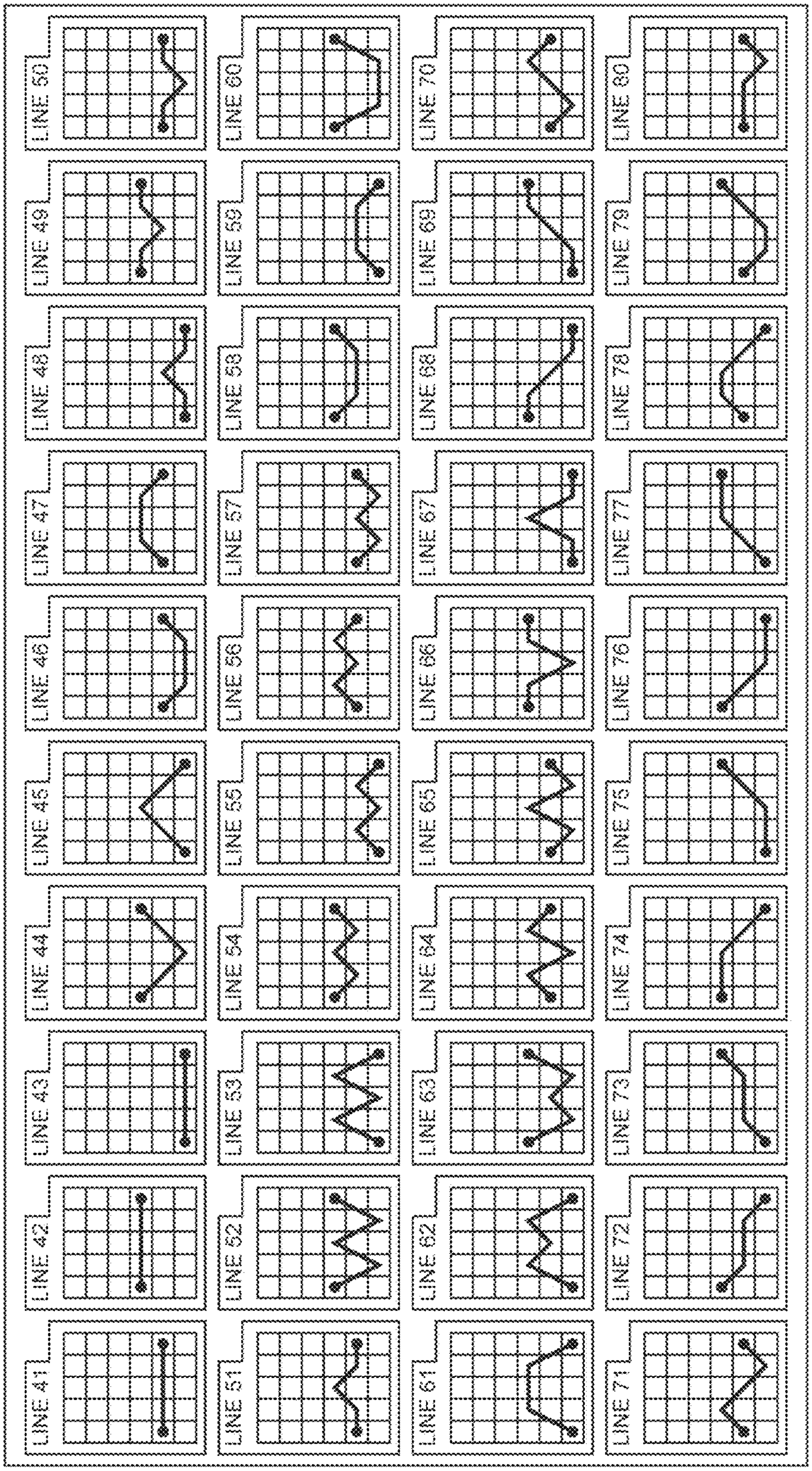
FIG. 8 is a diagram illustrating an example of pay lines set at a lower side of the second area.

Specifically, when the free game starts, the second area 62 displayed in a dark state is displayed with brightness equivalent to that of the first area 61, an expanded determination area is clearly shown to the player (see FIG. 12), and the same processing as that of the first game is iterated a predetermined number of times without consuming the credits in such a state. During the free games, a process is performed by applying alternation such as addition of the number of times that the free game is played when another predetermined condition is satisfied instead of providing the second game when a predetermined condition is satisfied. In addition, as illustrated in FIGS. 7 and 8, pay lines similar to those of the first area 61 are set in both of an upper half and a lower half of the second area 62. Accordingly, during the free games, the line judgment is also conducted for the pay lines of the upper half and the pay lines of the lower half of the second area 62, in addition to the pay lines set in the first area 61. Furthermore, during the free games, the scatter judgment is conducted for the cells of three rows and five columns of the first area 61 and the cells of six rows and five columns of the second area 62.

When the predetermined number of free games end, the flag Z is reset to Z=0 in S37 following S36, and the gaming machine 1 ends game provision and returns to the input standby state. In addition, even when it is determined that the flag Z is not set to Z=1 in S35, the gaming machine 1 ends the game provision and returns to the input standby state. The operation in the game providing state thus ends.

According to the gaming machine of this operation and the control method thereof, the first area 61 and the second area 62 sharing the virtual reel strips 71 to 75 are displayed, only the first area serves as the determination area in the first game, and both the first area 61 and the second area 62 serve as the determination area in the second game. Therefore, it is possible to provide the first game and the second game in a form such that they are related.

In addition, because the symbols are also displayed in the second area 62 during the first game in this embodiment, a range wherein the player can recognize the virtual reel strips 71 to 75 is expanded, and the game can be provided in a normal state with higher transparency. For example, when a feature such as a stack symbol of continuous identical symbols are included in the virtual reel strips 71 to 75, a broad range of the virtual reel strips 71 to 75 can be present constantly to the player, and the features can be shown to the player in a highly persuasive form.

In addition, in this embodiment, the first area 61 displays the symbols in the cells of three rows and five columns, whereas the second area 62 displays the symbols in the cells of six rows and five columns. Therefore, the determination area of three rows and five columns in the first game is expanded to the cells of the three rows and five columns plus the six rows and five columns in the second game. It is therefore possible to clearly show the player that a win chance is increasing in the second game.

Further, in this embodiment, the pay lines (see FIGS. 7 and 8) similar to the pay lines (see FIG. 6) set in the first area 61 are set in three rows of the upper half and three rows of the lower half of the second area 62, respectively. Thus, a line judgment of the same form as that conducted in the first area 61 during the first game can be applied to the three rows of the upper half and the three rows of the lower half of the second area 62, and a win determination of the second game can be conducted in a form easily recognizable to the player who has played the first game.

Figure 13:
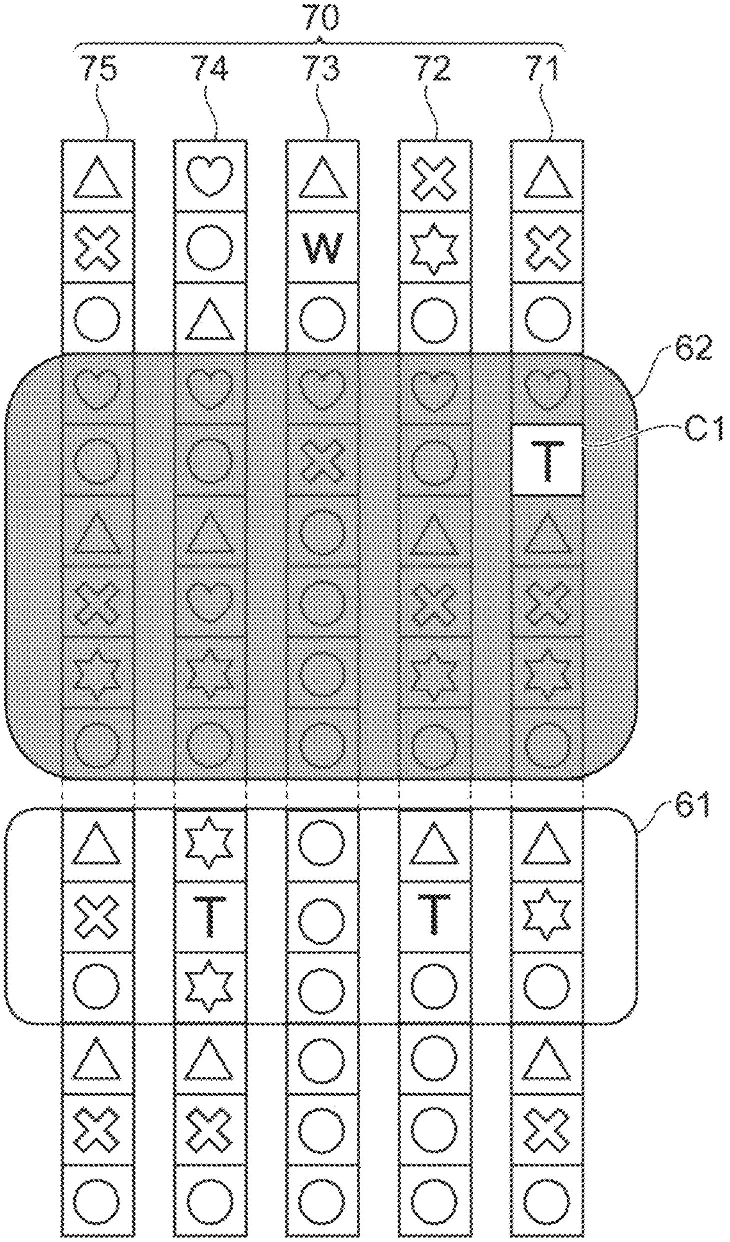
FIG. 13 is a diagram illustrating a state wherein the second area is partially set as a determination area during the first game.

Further, in the present embodiment, the gaming machine 1 may determine whether a predetermined condition for providing the second game is satisfied not only in the first area 61 but also in both of the first area 61 and the second area 62 during the first game in an exceptional case. For example, in case that the number of scatter symbols displayed in the first area 61 is less than predetermined number and the total number of scatter symbols displayed in the first area 61 and the second area 62 is equal or more than the predetermined number, the gaming machine 1 may determine the predetermined condition is satisfied with designated probability. Thus, it is possible to provide highly varied game proceedings by expanding a chance of providing the second game through symbols displayed in the second area 62 even during the first game. Further, in such a case, the gaming machine 1 may adopt a configuration to highlight the scatter symbol(s) in the second area 62 for the purpose of showing the advent of such an exceptional chance evidently. Such highlight may include, for example, a form in which only the scatter symbol(s) contributed to satisfying the predetermined condition in the second darkly displayed area 62 is(are) brightly displayed for spotlight irradiation, as illustrated in FIG. 13.

Figure 14:
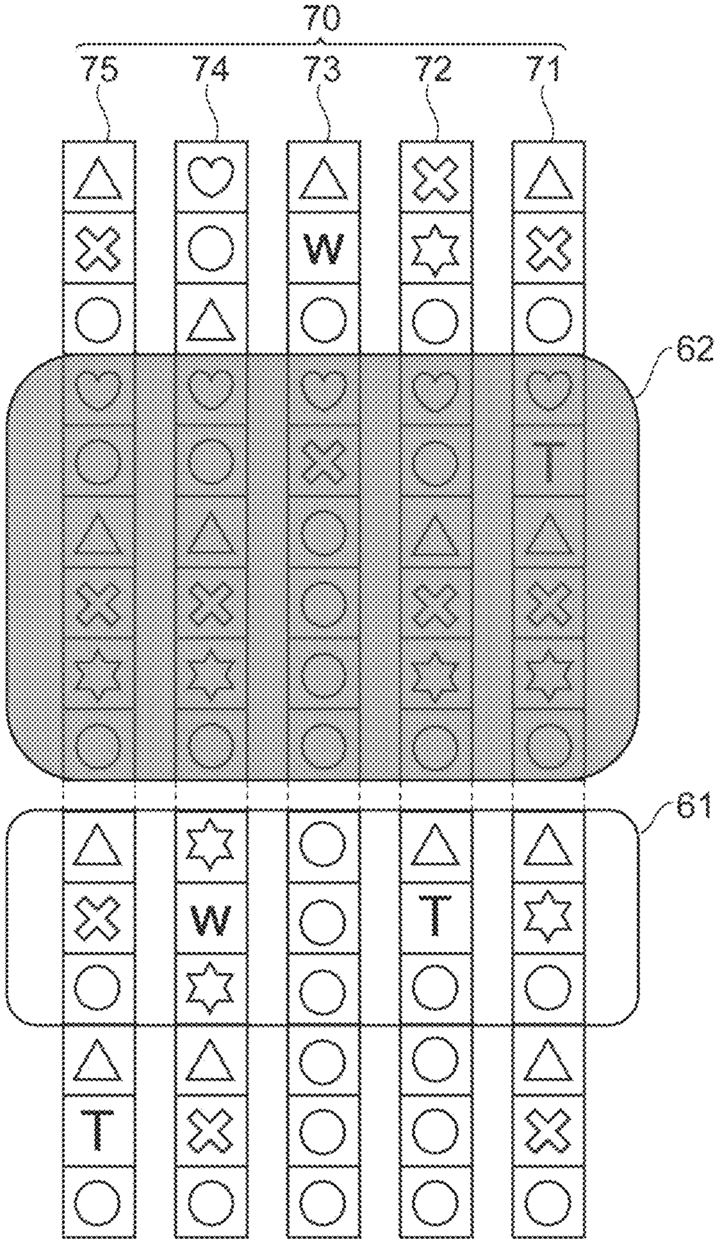
FIG. 14 is a diagram illustrating a state of each area of the symbol display area of FIG. 4 during the first game and an example of symbol arrangement.
Figure 15:
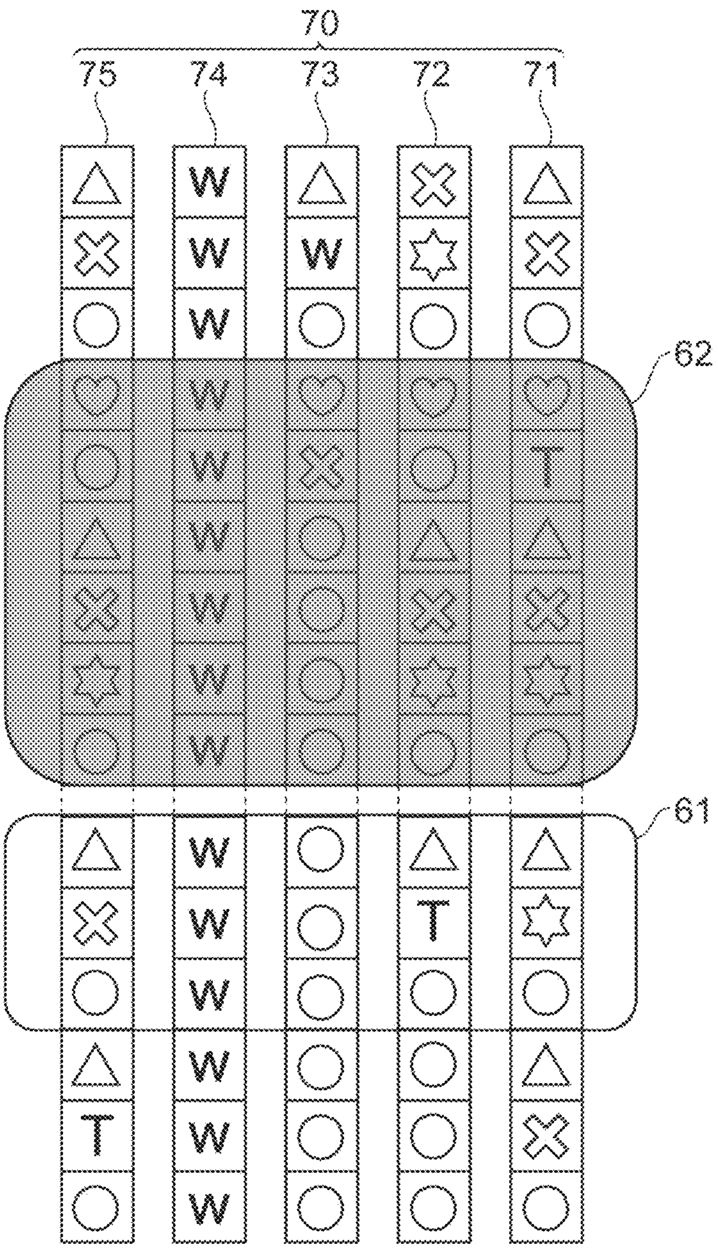
FIG. 15 is a diagram illustrating a state wherein all symbols of reel (2) in FIG. 14 are changed to wild symbols.
Figure 16:
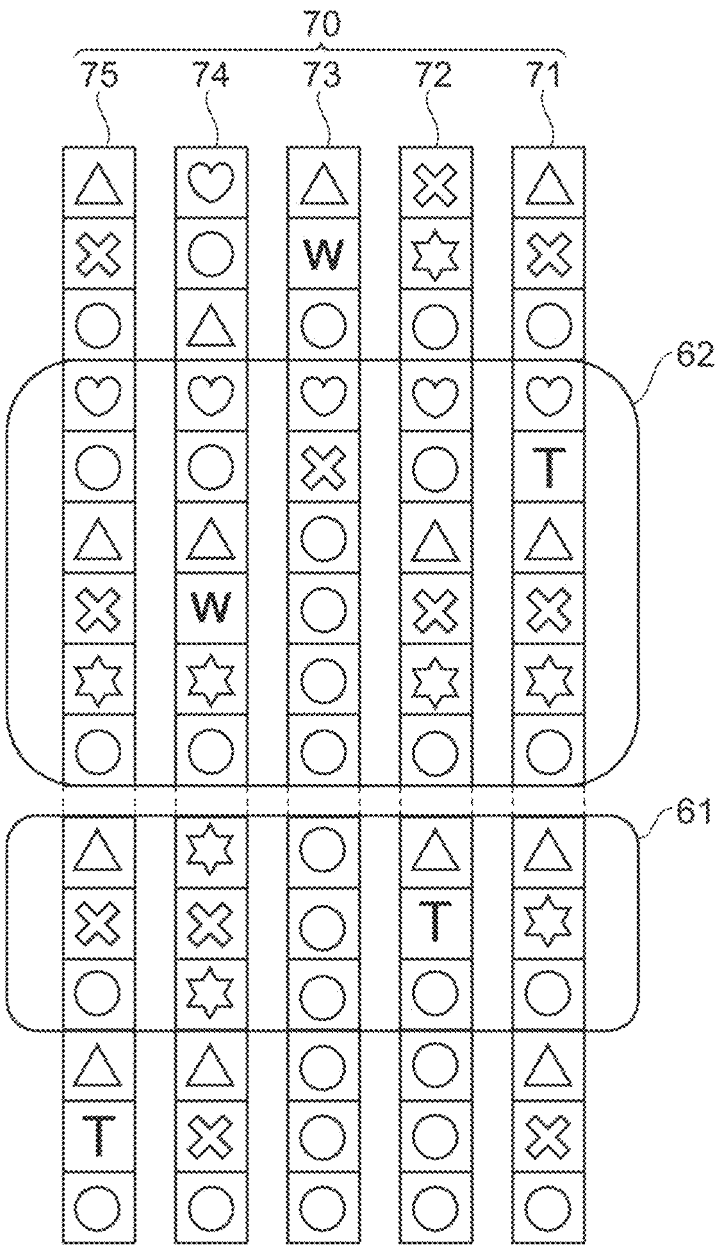
FIG. 16 is a diagram illustrating a state of each area of the symbol display area of FIG. 4 during the second game and an example of symbol arrangement.
Figure 17:
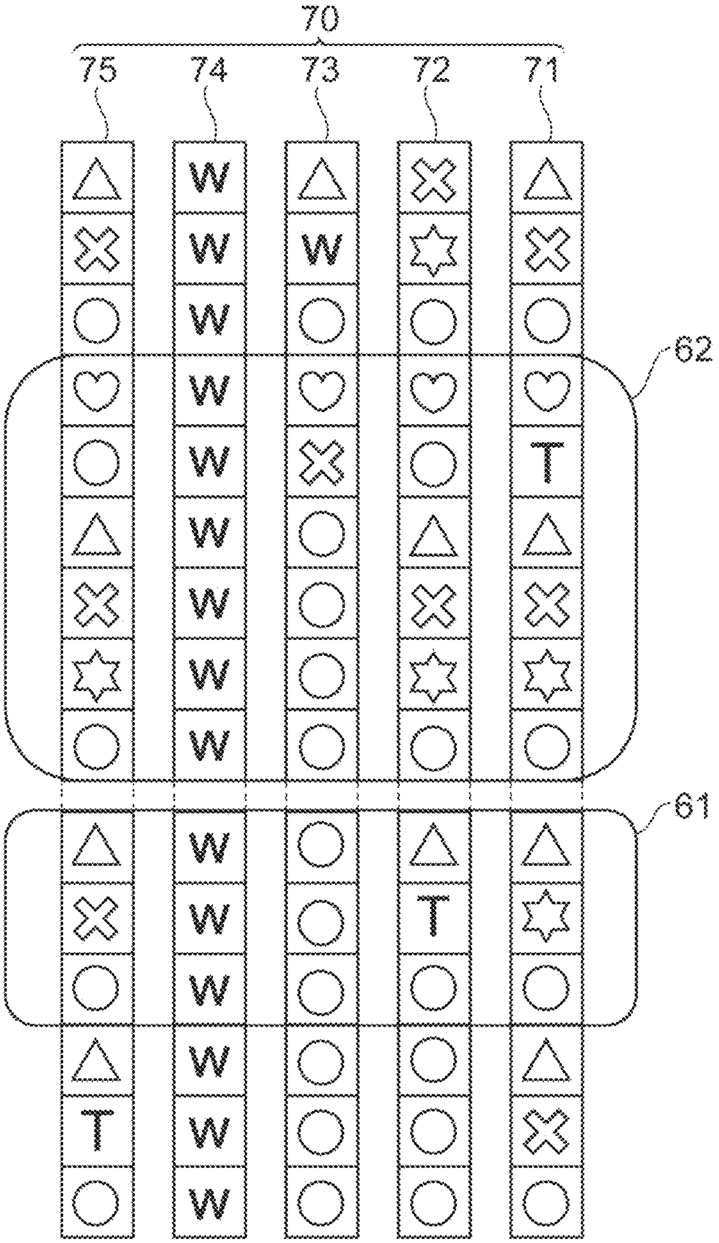
FIG. 17 is a diagram illustrating a state wherein all symbols of reel (2) in FIG. 16 are changed to wild symbols.

Further, the gaming machine 1 may adopt a configuration in which at least one wild symbol "W" is provided in at least one of the virtual reel strips 71 to 75 as illustrated in FIG. 14, and the wild symbol "W" is expanded to the entire reel as illustrated in FIG. 15 when the wild symbol "W" stops in the first area 61 in the first game. In addition to this, the wild symbol "W" may be expanded to the entire reel when the wild symbol "W" stops in the first area 61 or the second area 62 in the second game. Here, the wild symbol "W" is a symbol substituting another symbol at the time of the winning determination, and the wild symbol "W" may constitute a winning combination with an unspecified symbol. Further, the wild symbol "W" expanded to the entire reel is evaluated as normal wild symbol "W"s displayed in all the cells of the reel at the time of the winning determination. However, since the winning determination is not performed for the second area 62 during the first game as in FIGS. 14 and 15, the benefit of the wild symbol "W" is little, and an obtained dividend is limited. However, it is possible to explicitly show the player a distinguishing function of the game by expanding the wild symbol "W" to the entire reel during the first game. On the other hand, when the wild symbol "W" is expanded to the entire reel during the second game, it is possible to explicitly provide a game having high winning expectation since the winning determination is performed for both of the first area 61 and the second area 62 during the second game, as illustrated in FIGS. 16 and 17.

A gaming machine according to a second embodiment of the present invention will be described hereafter, with reference to the accompanying drawings. Like the gaming machine according to the first embodiment, the gaming machine according to this embodiment receives a predetermined game value from a player, generates a game outcome, and provides the player with a dividend according to the game outcome. As a main hardware configuration of the gaming machine according to this embodiment is similar to that of the gaming machine 1 according to the first embodiment, the illustration and description of the hardware configuration are omitted. Although a configuration and a state transition of the controller are similar to those in the first embodiment, an application program that provides a game differs, as do content of a game screen and an operation in a game providing state. These points of differences will be mainly described hereafter.

Figure 18:
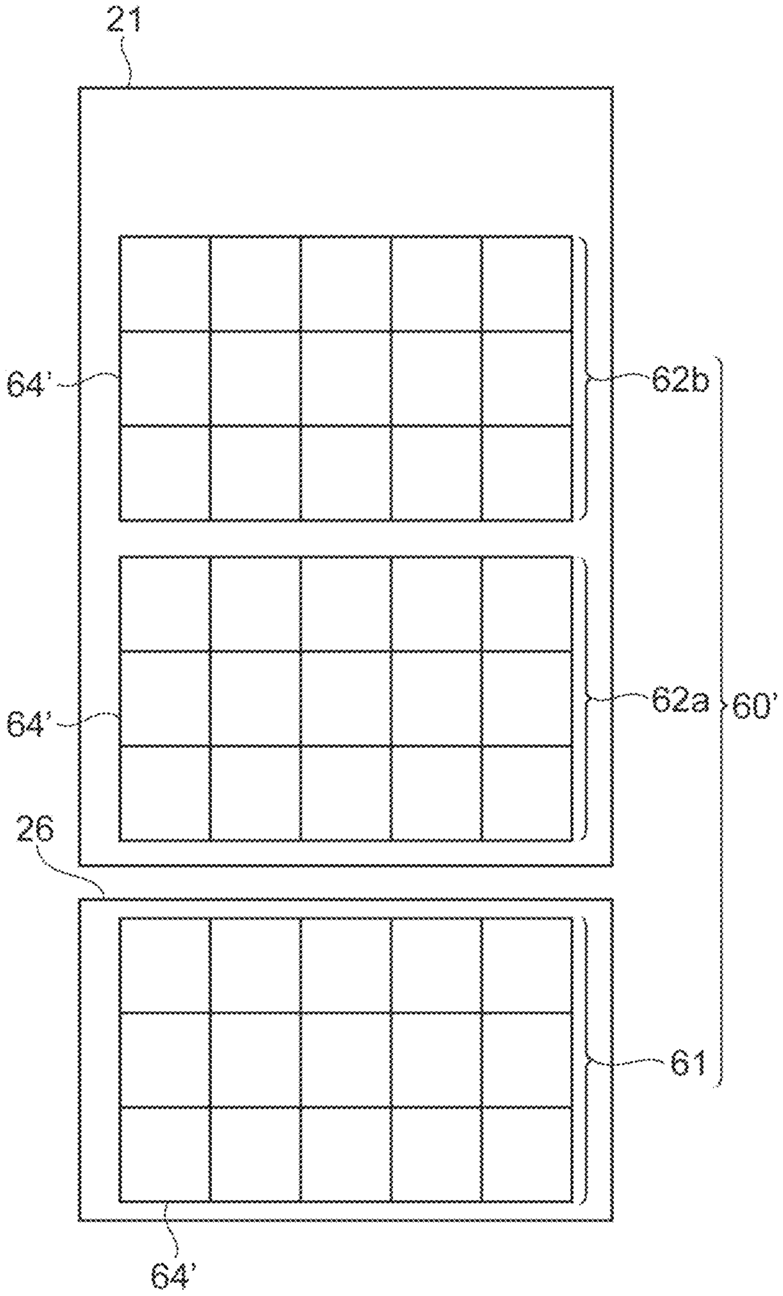
FIG. 18 is a schematic diagram illustrating an example of first, second, and third areas of a symbol display area of a gaming machine according to a second embodiment.

FIG. 18 is a schematic diagram of game screens displayed on an upper display 21 and a lower display 26 of the gaming machine according to this embodiment. As illustrated in FIG. 18, these game screens differ from the game screens in the first embodiment in that a symbol display area 60' includes a first area 61 displayed on the lower display 26 and a second area 62*a* and a third area 62*b* displayed on the upper display 21.

The first area 61, the second area 62*a*, and the third area 62*b* include a plurality of cells 64' which are stop positions of the symbols, as in the first embodiment. Specifically, the first area 61, the second area 62*a* and the third area 62*b* each includes 15 cells 64' arranged in a grid shape of three rows and five columns.

Figure 19:
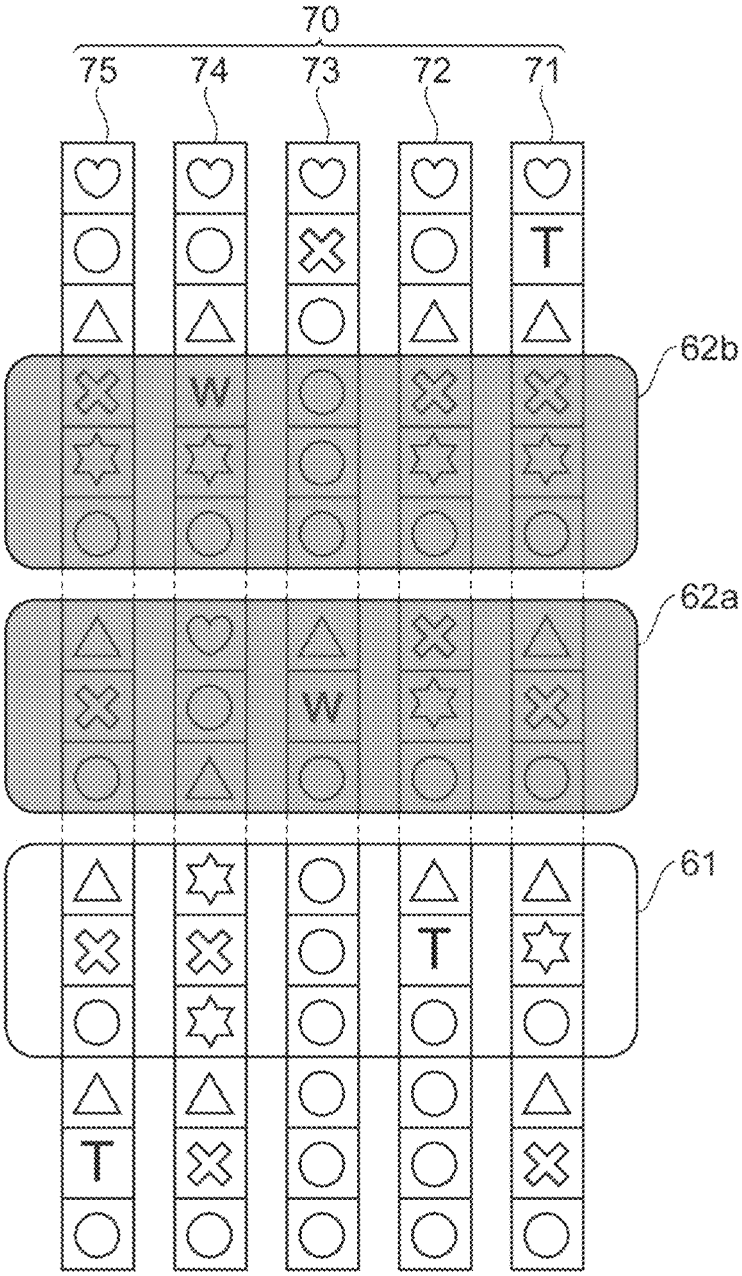
FIG. 19 is a diagram illustrating a state of each area of the symbol display area of FIG. 18 in a first game and an example of symbol arrangement.

As illustrated in FIG. 19, a symbol is displayed in each cell 64' of the symbol display area 60, based on symbol arrangement of virtual reel strips 71 to 75 constituting a virtual reel set 70. The description of virtual reel strips 71 to 75 would overlap with that of the first embodiment and is thus omitted. In this embodiment, three symbols are displayed in the first area 61 in each of the virtual reel strips 71 to 75, three symbols adjacent thereabove are displayed in the second area 62*a*, and three symbols adjacent above the three symbols displayed in the second area 62*a* are further displayed in the third area 62*b*. Accordingly, the symbols displayed in the first area 61, the second area 62*a*, and the third area 62*b* have mutual continuity. Further, for example, when the virtual reel strips 71 to 75 are displayed in a form wherein the virtual reel strips 71 to 75 spin to move the symbols from top to bottom, each symbol appears on an upper end of the third area 62*b*, moves downward, and leaves the third area 62*b* from a lower end. Next, after the symbol appears on an upper end of the second area 62*a*, moves downward, and leaves the screen from a lower end, the symbol appears on an upper end of the first area 61, moves downward, and leaves the screen from a lower end. In other words, each symbol continuously moves in the third area 62*b*, the second area 62*a*, and the first area 61. When the virtual reel strips 71 to 75 are displayed in a form wherein the virtual reel strips 71 to 75 spin in a reverse direction, the symbols continuously move in a reverse order. It should be noted that the second embodiment is similar to the first embodiment in that the symbols displayed in the first area 61, the second area 62*a*, and the third area 62*b* need not necessarily be adjacent.

The determination of the stop positions and the depiction on the upper display 21 and the lower display 26 are also similar to those in the first embodiment. In addition, like the pay lines (LINE 1 to LINE 40) of the first embodiment illustrated in FIG. 6, a pay line used for a line judgment is set in the first area 61, the second area 62*a*, and the third area 62*b*, respectively. Although the case in which the same pay lines are set has been described in this embodiment, each pay line may be an independent pay line. Boundary lines of the cells 64' are also similar to those in the first embodiment.

The second embodiment is similar to the first embodiment in that the two types of games are provided, i.e., a first game provided when a predetermined condition is not satisfied and a second game provided when the predetermined condition is satisfied, and that only a symbol arrangement displayed in the first area 61 in the first game serves as a win determination target. It should be noted that in the second embodiment, the second game includes a first stage and a second stage. The first stage and the second stage of the second game may be the same as or different from each other.

In this embodiment, the first stage of the second game in which symbols displayed in both the first area 61 and the second area 62*a* serve as the win determination target is provided, and the second stage of the second game in which all symbols displayed in the first area 61, the second area 62*a* and the third area 62*b* or, in other words, the entire symbol display area 60', serve as the win determination target when a predetermined condition is further satisfied during the first stage of the second game is provided. This embodiment thus differs from the first embodiment in that the winning determination target can be expanded during the second game.

This embodiment is also similar to the first embodiment in that a part that does not serve as the win determination target in the symbol display area 60' is displayed in a different form during the first game and the second game. In addition, it may be emphasized in this embodiment that a win determination is not conducted by displaying the second area 62*a* or the third area 62*b* that does not serve as the win determination target in a locked form or a sealed form.

This embodiment is also similar to the first embodiment in that a screen presentation may be conducted using the entire symbol display area 60' even when not the entire symbol display area 60' serves as a win determination target, and that a portion of the symbol display area 60' may exceptionally be set as the win determination target in certain cases.

Next, an operation in the game providing state of the gaming machine according to this embodiment will be described. As operations other than the operation during provision of the second game are similar to those of the first embodiment, however, descriptions thereof with reference to a flowchart will be omitted, and an operation during a free game as the second game will be mainly described.

Figure 20:
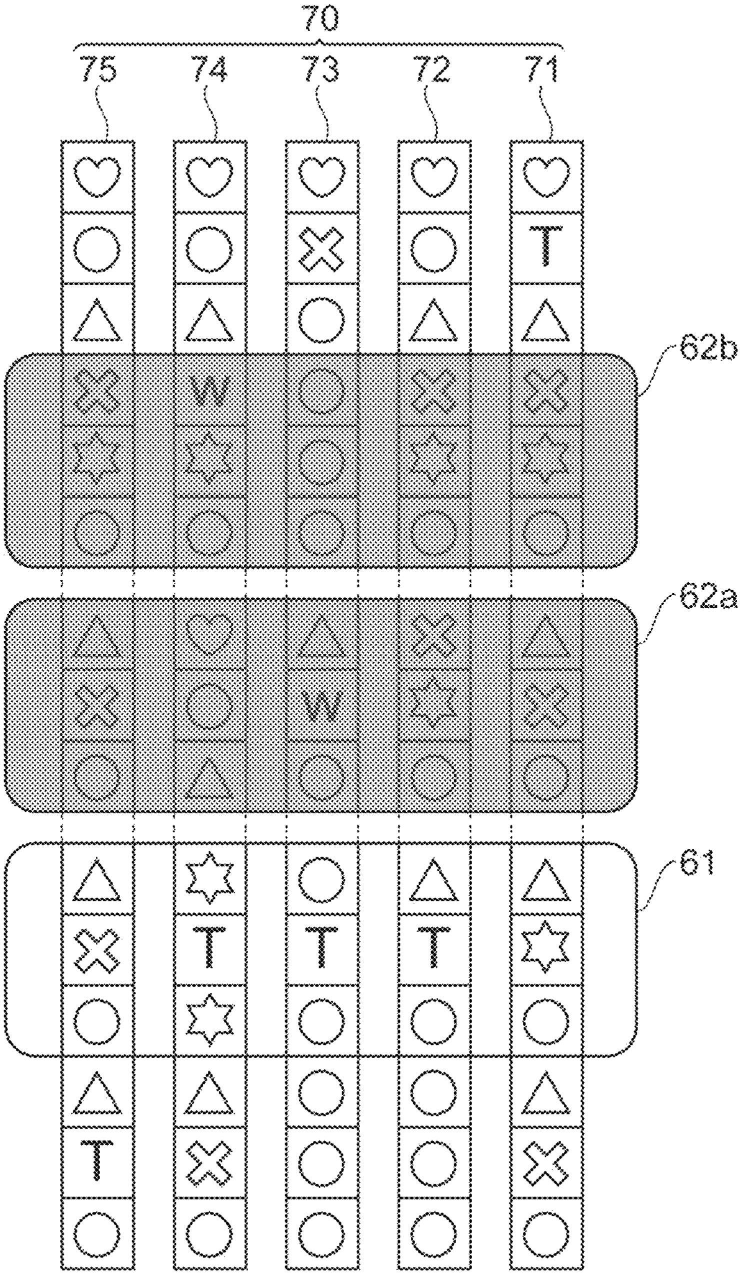
FIG. 20 is a diagram illustrating other state of each area of the symbol display area of FIG. 18.

The gaming machine according to this embodiment provides the first game in a state wherein only the first area 61 is bright and the second area 62*a* and the third area 62*b* are dark (see FIG. 19). Further, when a game outcome displayed in the first area 61 includes a predetermined number of scatter symbols "T," the gaming machine provides a predetermined number of free games as the first stage of the second game (see FIG. 20).

Figure 21:
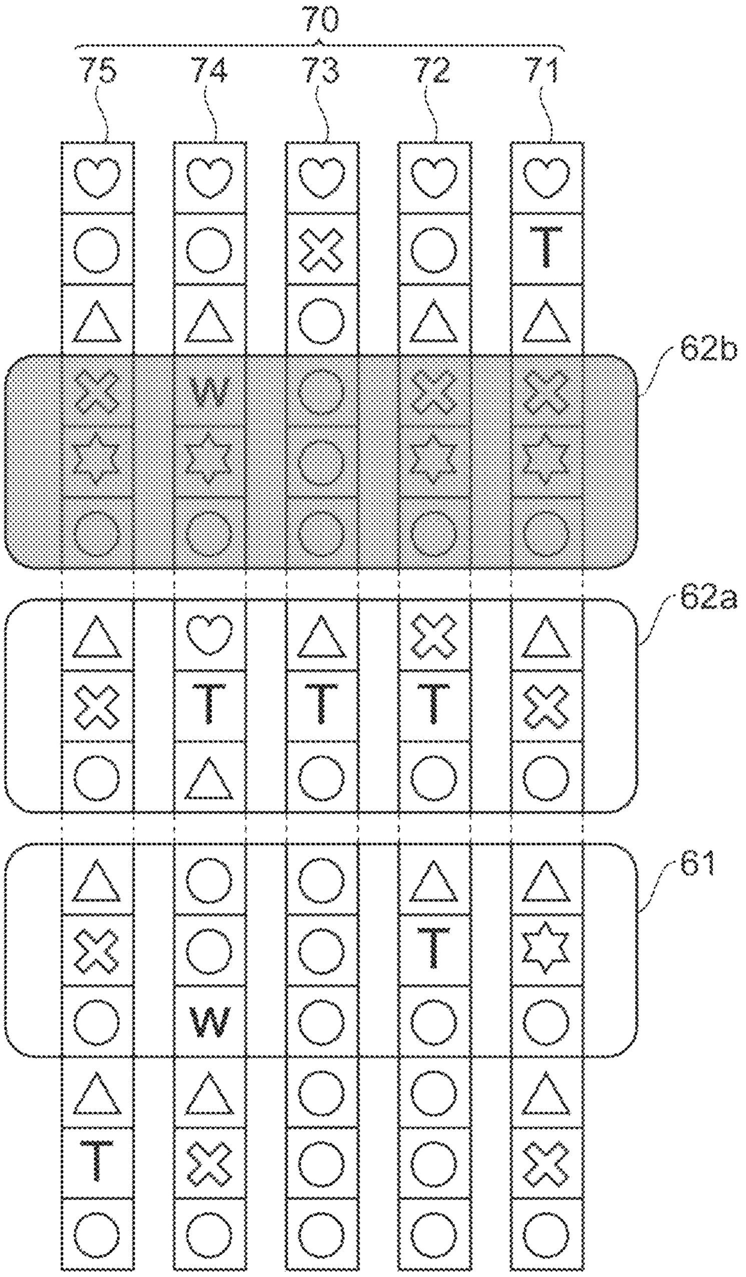
FIG. 21 is a diagram illustrating a state of each area of the symbol display area of FIG. 18 in a second game and an example of symbol arrangement.
Figure 22:
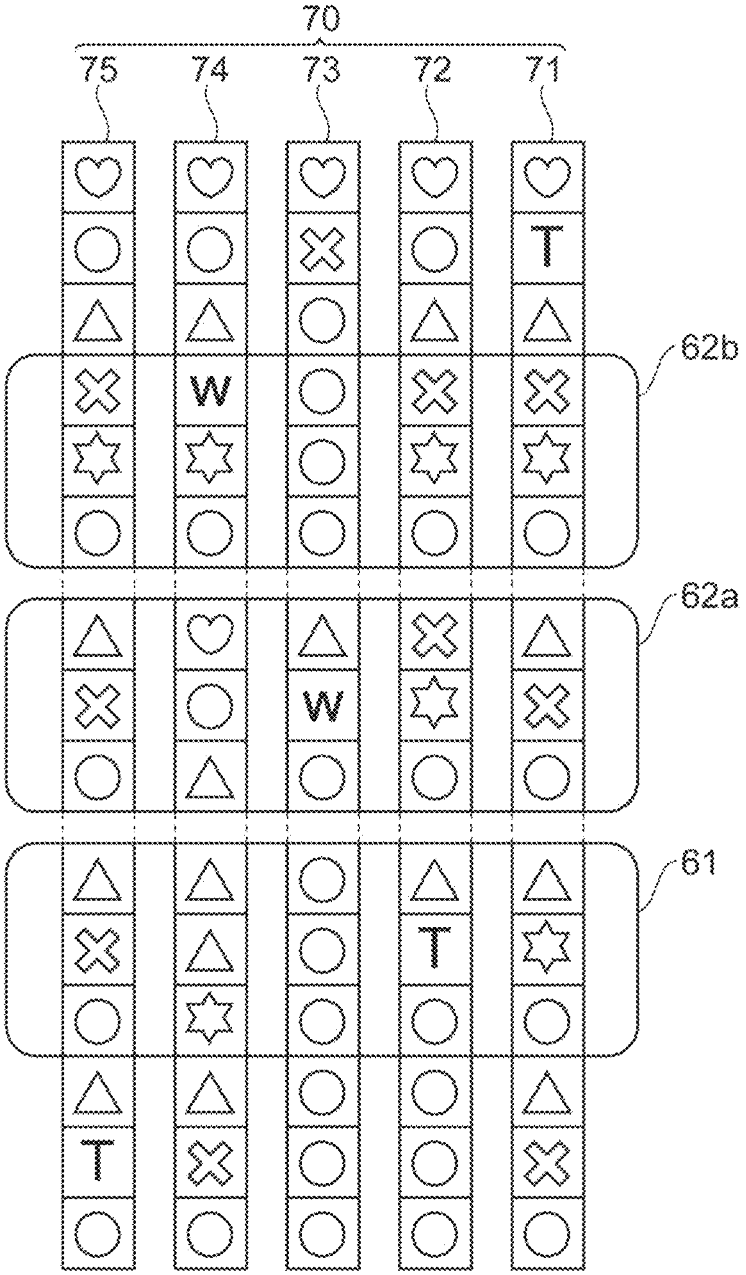
FIG. 22 is a diagram illustrating another state of the symbol display area of FIG. 18 in the second game.

When the free game starts here, the second area 62*a* displayed in a dark state is displayed with the brightness equivalent to the first area 61, the fact that the determination area has been expanded is clearly shown to the player (see FIG. 21), and a predetermined number of the free games are provided in that state. When a predetermined condition is satisfied during the free games, however, the determination area is expanded to the third area 62*b* and a number of free games are added as the second stage of the second game. In short, the determination area (i.e., whether or not the third area 62*b* is set as the determination area) differs between the first stage of the second game and the second stage of the second game. When the determination area is expanded to the third area 62*b*, the third area 62*b* displayed in the dark state is displayed with brightness equivalent to those of the first area 61 and the second area 62*a*, the fact that the determination area has been expanded is clearly shown to the player (see FIG. 22), and the remaining free game is provided. When a state wherein the second area 62*a* or the third area 62*b* does not serve as the win determination target is displayed in a locked form, a sealed form, etc., each display is released according to the expansion of the determination area.

According to the gaming machine of such an operation and the control method thereof, the first area 61, the second area 62*a*, and the third area 62*b* sharing the virtual reel strips 71 to 75 are displayed, only the first area is set as the determination area in the first game, and both the first area 61 and the second area 62*a* are set as the determination areas in the first stage of the second game. Furthermore, when the predetermined condition is satisfied in the first stage of the second game, the determination area is expanded to the third area 62*b* in the second stage of the second game. Therefore, the first game and the second game can be provided in a form with continuity as in the first embodiment, and the second game can be further expanded in a form with continuity. Various operations and effects described in the first embodiment are also provided accordingly in this embodiment.

It should be noted that a function of the controller 50 of the above-described gaming machine 1 can also be performed through a program executed by a computer. In other words, it is possible to produce a program that causes one or more computers to function as the above-described controller 50. The function implemented by executing such a program is similar to that of the above-described controller 50 or, in other words, a function of conducting the win determination for the symbols displayed in the first area 61 of the symbol display area 60 or 60' in the first game and conducting the win determination for the symbols displayed in the first area 61 and the second area 62 (the second area 62*a* as well as the third area 62*b*) in the second game is implemented. The above-described program may be provided, for example, as recorded on a computer-readable recording medium such as a ROM or a semiconductor memory.

As described above, the gaming machine according to the first embodiment of the present invention is a gaming machine for providing a game to a player in exchange for a game value, the gaming machine including: a display unit having a symbol display area including a first area and a second area, the display unit displaying a plurality of columns side by side with symbols displayed in each, the first area and the second area being provided in line with a direction of the columns; an operation unit configured to receive an operation by the player; and a controller connected to the display unit and the operation unit, wherein the controller rearranges symbols displayed in the symbol display area when the operation by the player is received in the operation unit, and provides a first game and a second game provided when a predetermined condition is satisfied, a win determination being conducted in the first game for symbols displayed in the first area from among the rearranged symbols, a win determination being conducted in the second game for symbols displayed in the first area and the second area from among the rearranged symbols.

In addition, the gaming machine according to the second embodiment of the present invention is a gaming machine for providing a game to a player in exchange for a game value, the gaming machine including: a display unit having a symbol display area including a first area, a second area, and a third area, the display unit displaying a plurality of columns side by side with symbols displayed in each, the first area, the second area, and the third area being provided in line with a direction of the columns; an operation unit configured to receive an operation by the player; and a controller connected to the display unit and the operation unit, wherein the controller rearranges symbols displayed in the symbol display area when the operation by the player is received in the operation unit, and provides a first game, a first stage of a second game and a second stage of the second game, a win determination being conducted in the first game for symbols displayed in the first area from among the rearranged symbols, a win determination being conducted in the first stage of the second game for symbols displayed in the first area and the second area from among the rearranged symbols, and a win determination being conducted in the second stage of the second game for symbols displayed in the first area, the second area, and the third area from among the rearranged symbols.

In these gaming machines, the win determination is conducted for the symbols displayed in the first area 61 of the symbol display area 60 or 60' in the first game, and the win determination is conducted for the symbols displayed in the first area 61 and the second area 62 (the second area 62*a* as well as the third area 62*b*) provided in line with the first area 61 in the second game. In other words, the first game and the second game are related in that they share the same symbol display area 60 or 60', making the continuous transition from the first game to the second game possible, and a superior user experience can be provided. In addition, because the determination area in the second game is further expanded from that in the first game using the same symbol display area 60 or 60', it is possible to indicate to the user in an easily recognizable form that a win chance in the second game is further expanded than that in the first game.

Furthermore, a configuration may be adopted wherein the controller 50 moves the symbols along the direction of the columns. Adopting such a configuration enables a form wherein the symbols continuously move in the first area 61 and the second area 62 (the second area 62*a* as well as the third area 62*b*), and a game with consistency in the entire symbol display area 60 or 60' can be provided. As the symbols move between the first area and the second area (the second area 62*a* as well as the third area 62*b*) when this configuration is adopted, the player can see both a process of winning a prize when the winning symbols move from the outside to the inside of the win determination area, as well as a process of not winning wherein the winning symbols stop in positions away from the determination area. Therefore, it is possible to improve visibility and transparency of the process until the game outcome is provided.

In addition, the controller 50 may determine that the predetermined condition is satisfied when the symbols displayed in the first area 61 satisfy a predetermined condition. In this case, for example, when a combination of predetermined symbols is displayed in the first area 61, it can be determined that the predetermined condition has been established.

Moreover, the controller 50 may have a form wherein a combination is assumed to satisfy a predetermined condition based on a predetermined probability, when the combination of the symbols displayed in the first area 61 and the symbols displayed in the second area 62 (the second area 62*a* as well as the third area 62*b*) satisfies the predetermined conditions in the first game. In such a form, it is possible to provide the second game to the player through a combination with the symbols displayed in the second area 62, even when the predetermined condition is not satisfied with only the symbols displayed in the first area 61. In this case, it is possible to clearly show the player an expansion of such an opportunity by adopting a form wherein the symbols displayed in the second area 62 (the second area 62*a* as well as the third area 62*b*) are highlighted.

In addition, a form may be adopted wherein the controller 50 provides, as a second game, a predetermined number of free games without exchange for the game value. In this case, a win determination is conducted for the first area 61 and the second area 62 (the second area 62*a* as well as the third area 62*b*) during the free games.

Furthermore, a form may be adopted wherein a win determination portion is expanded or reduced according to specific symbols displayed in the symbol display area 60 (symbol display area 60') during such free games.

In addition, a form may be adopted wherein the controller 50 expands a win determination portion in the second area 62 (the second area 62*a* as well as the third area 62*b*) according to a number of the game value that the player exchanged for the game. In this case, a configuration may be adopted wherein the player determines an area to be used for a win determination by adjusting the number of bets.

Moreover, a form may be adopted wherein the display unit 27 includes the upper display (the first display) 21 that displays the first area 61, and the lower display (the second display) 26 that displays the second area 62 (the second area 62*a* as well as the third area 62*b*).

The present invention is not limited to the first or second embodiment described above, and various variations may be made thereto. For example, although the gaming machine providing a game in the form of a slot machine has been described in the embodiment described above, the present invention is not limited thereto and the game may be provided in a form such as a video card game like poker or blackjack, as well as bingo, keno, or a wheel game. In addition, the present invention may be applied to a pachinko machine or a pachinko-slot machine. Moreover, the present invention is not limited to the operations or flowcharts described in above embodiments, and various variations may be made there to. For example, gaming machine may obtain necessary random numbers, determine stop positions of the reels and perform win determinations firstly. In this case, gaming machine may sequentially depict corresponding game screens on the display after that.

Furthermore, although the gaming machine 1 equipped with the upper display 21 and the lower display 26 has been described in the above-described embodiments, one display including functions of the upper display 21 and the lower display 26 may be used, or a configuration may be adopted wherein the functions are distributed to three or more displays.

Moreover, although the form wherein a bill or ticket is shown as the game value, the bill or ticket is received by the bill/ticket identification device, and the ticket is output by the printer has been described in the above-described embodiment, the present invention is not limited thereto. The concept of the game value includes tangible objects such as hard currency, bills, coins, medals, or tickets, etc., as well as electronic data having a value equivalent thereto. For example, a form may be adopted wherein coins are received by a coin acceptor and paid from a coin hopper. A form may be adopted wherein a player is identified, credit accumulated in an account on a server is used, and credit is paid to the account, as well as wherein credit information recorded on a storage medium such as a magnetic card or an integrated circuit (IC) card is read then used, and credit paid by writing to the storage medium.

In addition, although the case wherein the free game is provided as the second game has been shown in the above-described embodiment, a bonus game using different virtual reel strips from the first game may be provided. Furthermore, the game may be a feature game to be provided according to a value of a random number acquired during the first game.

Moreover, the predetermined condition for provision of a second game is not limited to the scatter judgment or the line judgment, and a configuration may be adopted, for example, wherein a second game is provided when the number of bets exceeds a predetermined value. A configuration wherein the second game is provided according to a value of a random number acquired in the first game may be also adopted.

Figure 12:
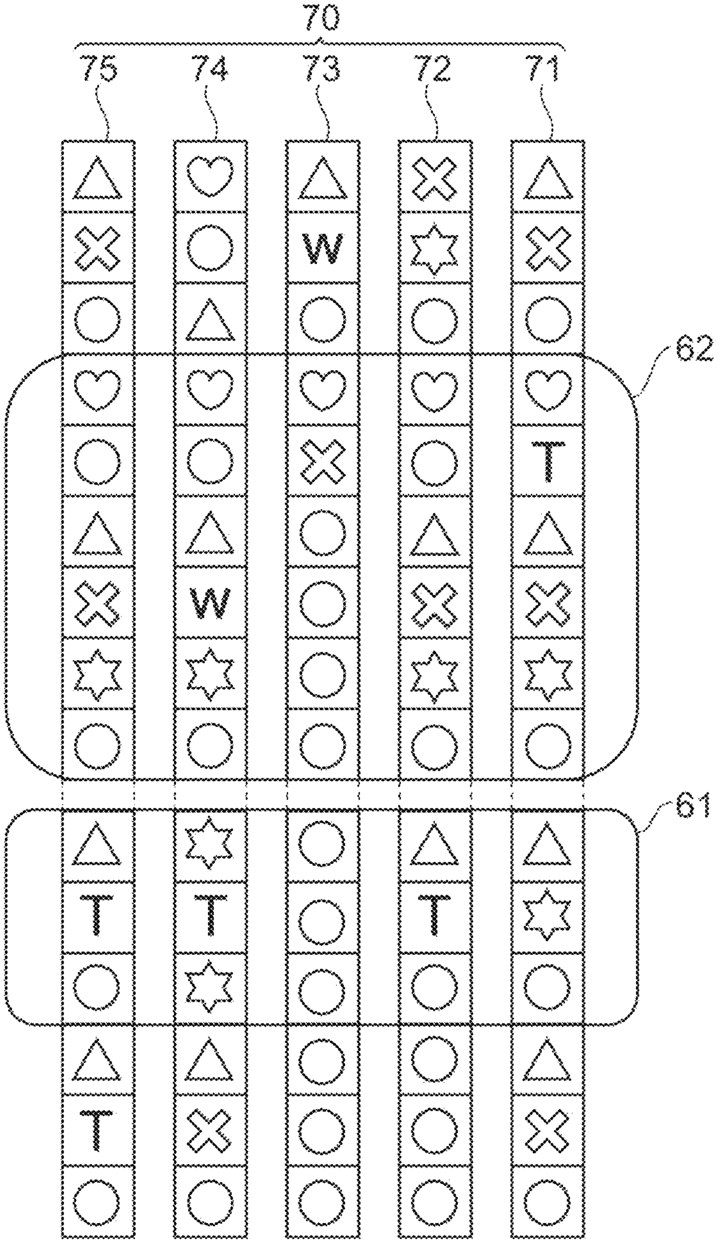
FIG. 12 is a diagram illustrating a state of each area of the symbol display area of FIG. 4 in the second game and an example of symbol arrangement.

In addition, a form may be adopted wherein only some cells are added to the determination area rather than the entire area of the second area 62, the second area 62*a*, or the third area 62*b* when the second game is provided. FIG. 13 illustrates a state wherein only the cell C1 of the second area 62 is added to the determination area and displayed with brightness equivalent to the first area 61, when the second game is provided in the first embodiment. Further, when a predetermined condition has been established during the second game provided in the state of FIG. 13, the determination area may be further expanded. FIG. 12 illustrates a state wherein four scatter symbols "T" appear in the determination area (the first area 61 and the cell C1 of the second area 62) of the symbol display area 60, and the entirety of the second area 62 is added to the determination area and displayed with brightness equivalent to the first area 61. A corresponding form may be adopted in the second embodiment as well. In contrast, a condition for reducing the determination area may be defined, or a combination of a condition for expanding the determination area and a condition for reducing the determination area may be applied.

Furthermore, although the form wherein a predetermined number of the free games is provided as the second game has been shown in the above-described embodiment, the second game may be provided without limiting the number of the free games. In this case, a configuration in which a combination of specific symbols, a value of a random number acquired during a second game, etc., is used as an end condition of the second game, with the second game provided until the end condition is satisfied.

Moreover, when the second game is provided according to the number of bets, the number of cells 64 or 64' added to the determination area of the second area 62 or 62*a*, or the third area 62*b*, can be increased according to the number of bets. In this case, the player can optionally determine the number of cells 64 or 64' added to the determination area by increasing or decreasing the number of bets.

Furthermore, although the configuration wherein the first area 61 is provided below the symbol display area 60 or 60' and the second area 62, the second area 62*a*, or the third area 62*b* is provided thereabove has been adopted in the above-described embodiment, the first area 61 may be provided above the symbol display area 60 or 60'.

What is claimed is:

1. A gaming machine for providing a game to a player, the gaming machine comprising:

an acceptor device configured to accept physical media indicative of a monetary value to establish a credit balance;

a display unit having a symbol display area including a first area and a second area, the display unit displaying a plurality of columns side by side with symbols displayed in each area, each column having a plurality of cells, the first area and the second area being provided vertically in line with a direction of the columns, wherein the symbols are provided by a set of virtual reel strips, at least one of the virtual reel strips being associated with a shared column of the first area and a shared column of the second area such that the shared column of the first and second areas have mutual continuity;

an operation unit configured to receive an operation by the player; and a controller connected to the display unit, the acceptor device and the operation unit, wherein the controller rearranges symbols displayed in the symbol display area when the operation by the player is received in the operation unit, wherein the controller rearranges the symbols in the cells of the display area in a manner to simulate rotation of the virtual reel strips, wherein the at least one of the virtual reel strips rotates through the respective shared columns, wherein the simulated rotation causes the at least one of the virtual reel strips to rotate through all of the cells of the shared columns, the symbols in the cells forming an outcome.

2. The gaming machine according to claim 1, wherein the controller causes the symbols to move along the direction of the columns.

3. The gaming machine according to claim 1, wherein the controller provides a first game using the first area and a second game using the second area.

4. The gaming machine according to claim 3, wherein the controller provides the second game when a predetermined condition associated with the first game is satisfied.

5. The gaming machine according to claim 4, wherein second game includes a predetermined number of free games without exchange of the game value.

6. The gaming machine according to claim 5, wherein the controller expands or reduces a part of the win determination in the second area according to a display of specific symbols in the symbol display area during the free games.

7. The gaming machine according to claim 6, wherein the controller expands a part of the win determination in the second area according to a number of the game value that the player exchanged for the game.

8. The gaming machine according to claim 1, wherein the display unit includes a first display configured to display the first area and a second display configured to display the second area.

9. A method of controlling a gaming machine for providing a game to a player, the gaming machine includes an acceptor device, a display unit, an operation unit and a controller, the method including the steps of:

accepting physical media indicative of a monetary value at the acceptor device and responsively establishing a credit balance;

displaying, by the display unit, a symbol display area including a first area and a second area, each area including a plurality of columns side by side with symbols displayed in each area, each column having a plurality of cells, the first area and the second area being provided vertically in line with a direction of the columns;

providing a set of virtual reel strips, at least one of the virtual reel strips being associated with a shared column of the first area and a shared column of the second area such that the shared column of the first and second areas have mutual continuity; and, rearranging, by the controller, symbols displayed in the symbol display area when an operation by the player is received in the operation unit, wherein the symbols are rearranged in a manner to simulate rotation of the virtual reel strips, wherein the at least one of the virtual reel strips rotates through the respective shared columns, wherein the simulated rotation causes the at least one of the virtual reel strips to rotate through all of the cells of the shared columns, the symbols in the cells forming an outcome.

10. The gaming machine according to claim 9, including the step of causing, by the controller, the symbols to move along the direction of the columns.

11. The gaming machine according to claim 9, including the steps of providing a first game using the first area and providing a second game using the second area.

12. The gaming machine according to claim 11, wherein the second game is provided when a predetermined condition associated with the first game is satisfied.

13. The gaming machine according to claim 12, wherein the second game includes a predetermined number of free games without exchange of the game value.

14. The gaming machine according to claim 13, including the step of expanding or reducing a part of the win determination in the second area according to a display of specific symbols in the symbol display area during the free games.

15. The gaming machine according to claim 14, wherein a part of the win determination is expanded in the second area according to a number of the game value that the player exchanged for the game.

16. The gaming machine according to claim 9, wherein the display unit includes a first display configured to display the first area and a second display configured to display the second area.

17. A non-transitory computer-readable recording medium storing a program of a gaming machine for causing one or more computers to implement a function of providing a game to a player using a display unit having a symbol display area including a first area and a second area, the display unit displaying a plurality of columns side by side with symbols displayed in each area, each column having a plurality of cells, the first area and the second area being provided vertically in line with a direction of the columns, wherein the symbols are provided by a set of virtual reel strips, at least one of the virtual reel strips being associated with a shared column of the first area and a shared column of the second area such that the shared column of the first and second areas have mutual continuity, the program causing the one or more computers to function as:

an operation unit configured to receive an operation by the player; and a controller connected to the display unit and the operation unit, wherein the controller rearranges symbols displayed in the symbol display area when the operation by the player is received in the operation unit, wherein the controller rearranges the symbols in the cells of the display area in a manner to simulate rotation of the virtual reel strips, wherein the at least one of the virtual reel strips rotates through the respective shared columns, wherein the simulated rotation causes the at least one of the virtual reel strips to rotate through all of the cells of the shared columns, the symbols in the cells forming an outcome.

* * * * *